US005481257A

United States Patent [19]

Brubaker et al.

[11] Patent Number: 5,481,257
[45] Date of Patent: Jan. 2, 1996

[54] REMOTELY CONTROLLED VEHICLE CONTAINING A TELEVISION CAMERA

[75] Inventors: Curtis M. Brubaker, 10560 Dolcedo Way, Los Angeles, Calif. 90077; Harry B. Wykes, Manhattan Beach; Harold D. Pierce, Canoga Park, all of Calif.; Robert C. Dixon, Palmer Lake, Colo.; Lawrence H. Post, Ballwin, Mo.

[73] Assignee: Curtis M. Brubaker, Los Angeles, Calif.

[21] Appl. No.: 248,542

[22] Filed: May 24, 1994

Related U.S. Application Data

[63] Continuation of Ser. No. 97,094, Jul. 23, 1993, abandoned, which is a continuation of Ser. No. 793,258, Nov. 12, 1991, abandoned, which is a continuation of Ser. No. 593,100, Oct. 5, 1990, abandoned, which is a continuation of Ser. No. 22,019, Mar. 5, 1987, abandoned.

[51] Int. Cl.$^6$ .................................................... G08C 19/16
[52] U.S. Cl. ..................... 340/825.69; 348/114; 446/456
[58] Field of Search ......................... 340/825.69, 825.72; 348/143, 148, 114, 118, 121, 122; 318/16; 434/69, 63; 273/86 R; 455/352; 359/142, 714; 446/454, 456; 370/18; 375/87

[56] References Cited

U.S. PATENT DOCUMENTS

| 3,086,465 | 4/1963 | De Montfort | 358/100 |
| 3,189,744 | 6/1965 | Ogland et al. | 250/199 |

(List continued on next page.)

FOREIGN PATENT DOCUMENTS

| 3008604A | 9/1981 | Germany . |
| 46-38093 | 11/1971 | Japan . |
| 51-98693 | 8/1976 | Japan . |
| 57-148487 | 9/1982 | Japan . |
| 59-22196 | 2/1984 | Japan . |
| 62-164095 | 10/1987 | Japan . |
| 63-65889 | 3/1988 | Japan . |
| 63-71098 | 5/1988 | Japan . |
| 63-127781 | 5/1988 | Japan . |

OTHER PUBLICATIONS

Lockwood, et al., "Very High–Resolution Television For Visual Simulation", Journal of the SMPTE, vol. 79, No. 4, Apr. 1970, pp. 317–325.
Lobb, et al., "New Solutions to the Depth of Field Problem in Flight Simulation Image Pick–Up Devices" SPIE vol. 59, Mar. 1975, Simulators & Simulation, pp. 80–87.
*Aviation Week & Space Technology*, vol. 117 (1982), Dec., No. 24 P. J. Klass, "Sky Eye RPV Squadron Due for Export Delivery".
*Electro/81 Conference Record*, vol. 6, Apr. 7–9, 1981, pp. 8C/3: 1–10, H. Wichansky et al., "Fiber Optic Implications for Missile Guidance Design".
*Patent Abstracts of Japan*, vol. 10, No. 319 (E–450) (2375) Oct. 30, 1986, Japanese patent application 61 128 639 dated Jun. 16, 1986.

*Primary Examiner*—Donald J. Yusko
*Assistant Examiner*—Edwin C. Holloway, III
*Attorney, Agent, or Firm*—Ladas & Parry

[57] ABSTRACT

A radio control toy incorporating a module containing a compact television camera, radio frequency transmitter and radio control receiver is described. The camera incorporates a lens system designed to record point of view impressions from the toy and a microphone to provide impressions of the audio environment for transmission by the radio frequency transmitter to a remote television module. The television module incorporates means to receive the video and audio transmissions from the camera and reproduce them via a television system and audio speaker associated with the television module. A control module allows an operator, viewing the television screen and hearing the audio sounds reproduced, to operate a set of controls associated with a control module and control signals derived from the position of the controls are transmitted by a radio control transmitter in the television module to the radio control receiver in the camera module. The camera module may be used in a variety of mobile toys thus providing the operator with a pleasurable simulation of the point of view associated with much larger environments or full scale vehicles.

8 Claims, 17 Drawing Sheets

U.S. PATENT DOCUMENTS

| | | | |
|---|---|---|---|
| 3,472,333 | 10/1969 | Loewenstern, Jr. | 446/456 |
| 3,659,378 | 5/1972 | Tong | 446/456 |
| 3,953,111 | 4/1976 | Fisher et al. | 359/714 |
| 4,073,086 | 2/1978 | Ogawa | 446/456 |
| 4,124,815 | 11/1978 | Stoschek | 379/59 |
| 4,171,592 | 10/1979 | Saitoh | 446/456 |
| 4,197,672 | 4/1980 | Mabuchi et al. | 446/456 |
| 4,208,834 | 6/1980 | Lin | 446/456 |
| 4,213,270 | 7/1980 | Oda | 446/456 |
| 4,214,402 | 7/1980 | Ogawa | 446/456 |
| 4,226,292 | 10/1980 | Monte et al. | 180/6.5 |
| 4,255,810 | 3/1981 | Solomon et al. | 375/87 |
| 4,267,606 | 5/1981 | Stelter et al. | 455/603 |
| 4,281,876 | 8/1981 | Lansberry | 299/1 |
| 4,406,085 | 9/1983 | Rhodes | 446/456 |
| 4,480,401 | 11/1984 | Matsushiro | 446/456 |
| 4,503,506 | 3/1985 | Sturges, Jr. | 364/513 |
| 4,548,584 | 10/1985 | Townsend | 434/118 |
| 4,567,514 | 1/1986 | Morgan et al. | 358/100 |
| 4,601,047 | 7/1986 | Horwitz et al. | 370/18 |
| 4,697,260 | 9/1987 | Grauel et al. | 370/18 |
| 4,817,948 | 4/1989 | Simonelli | 273/86 B |

AUDIO AMPLIFIER

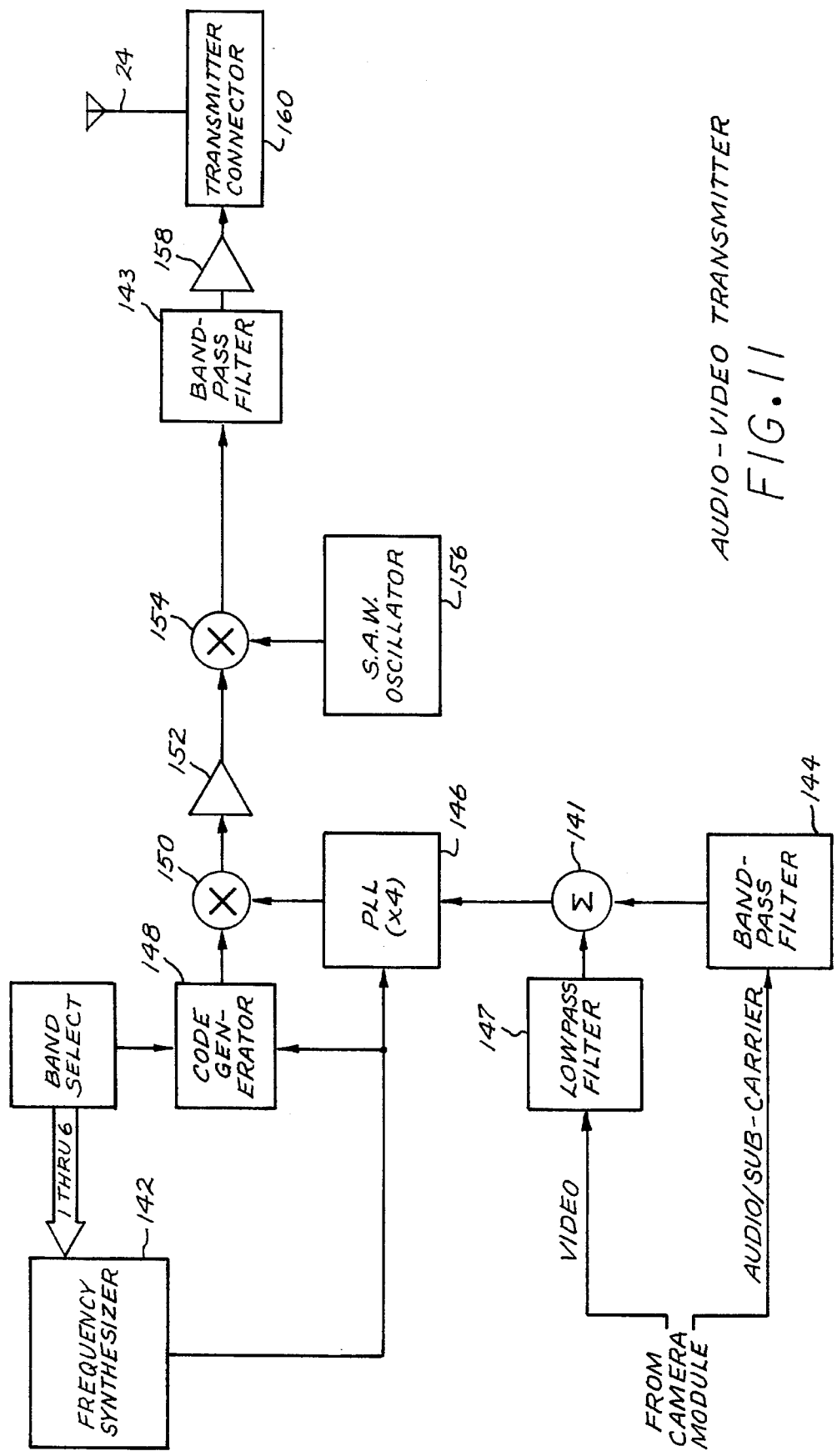
FIG. 11 AUDIO-VIDEO TRANSMITTER

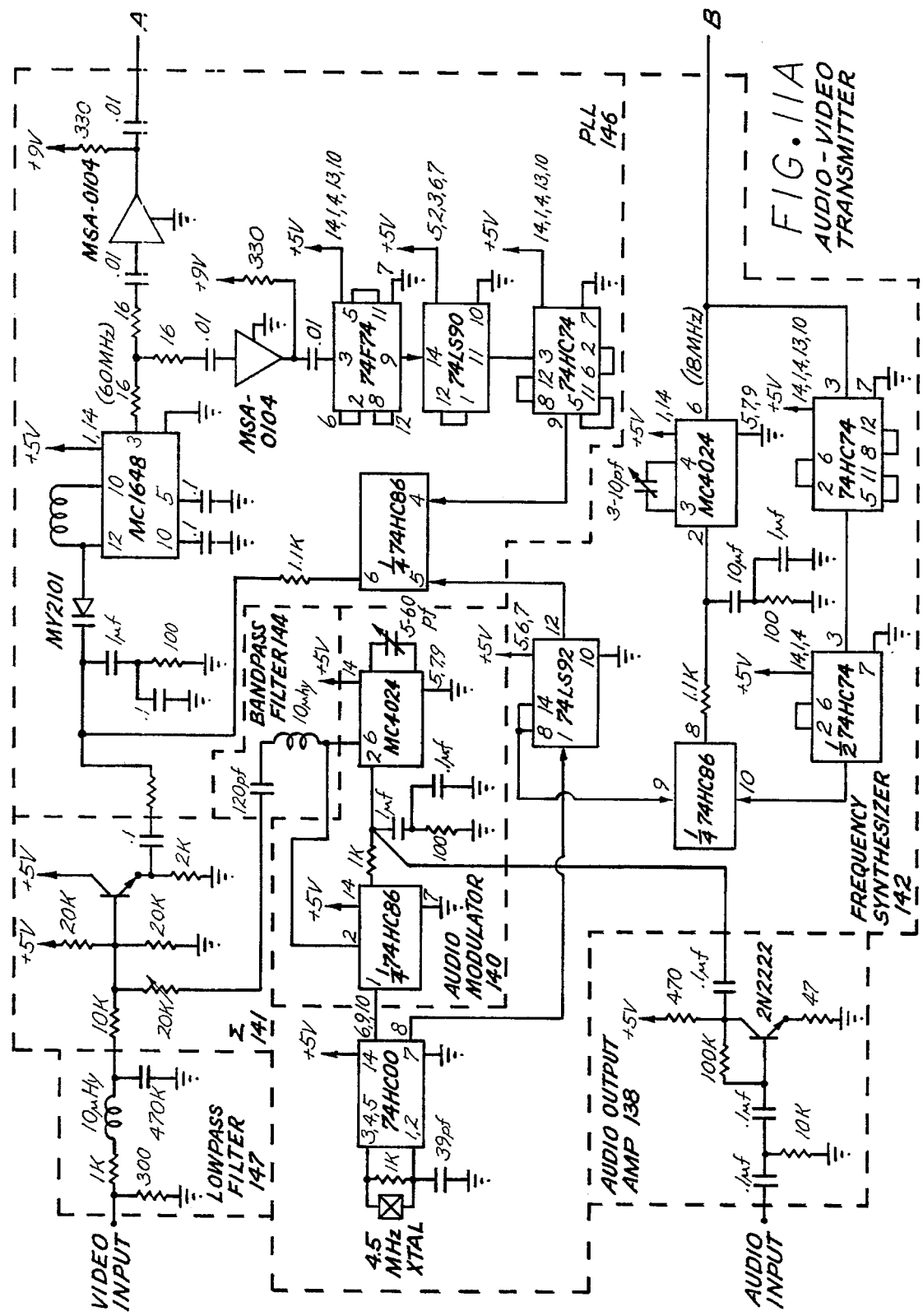
FIG. 11A AUDIO-VIDEO TRANSMITTER

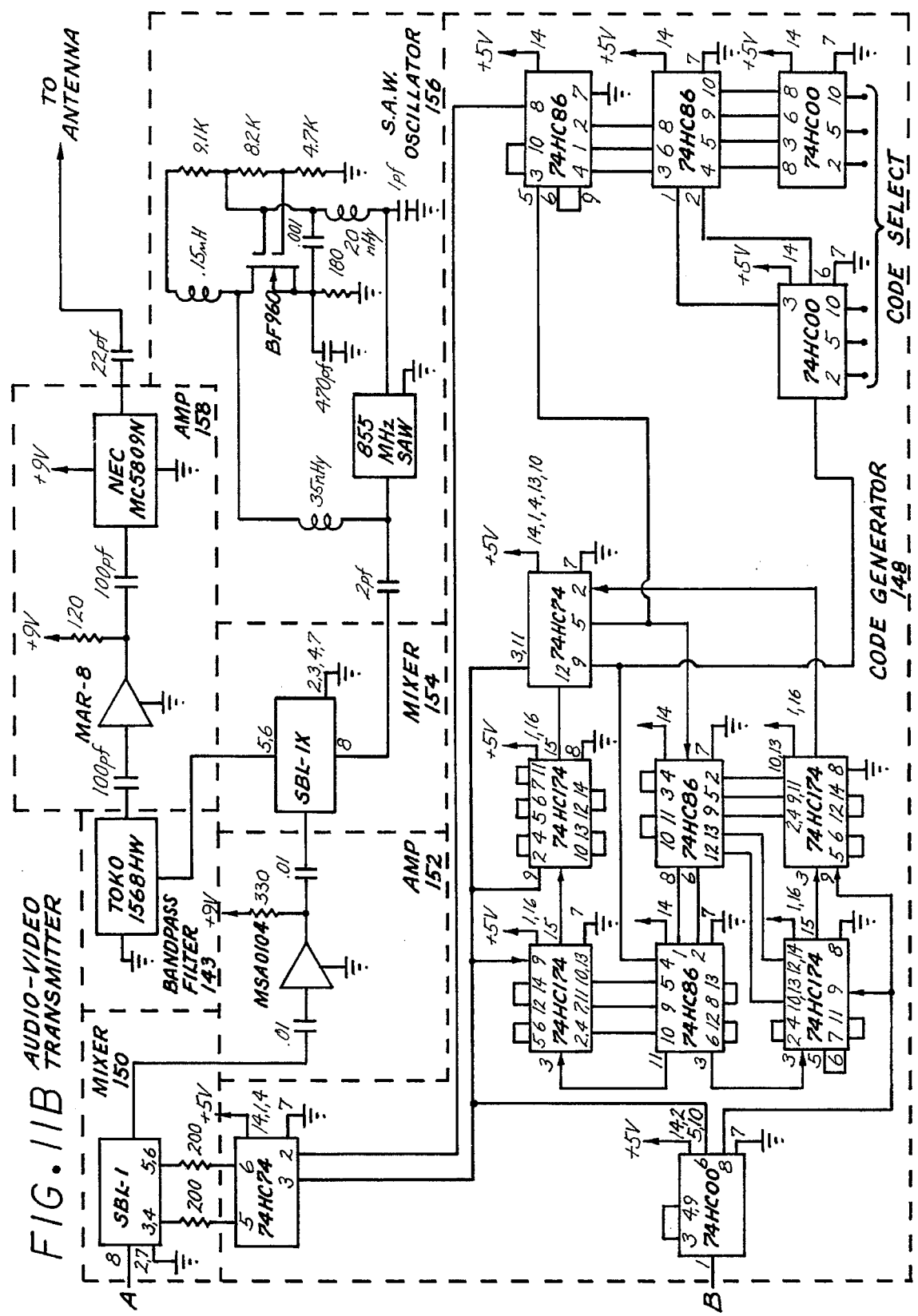

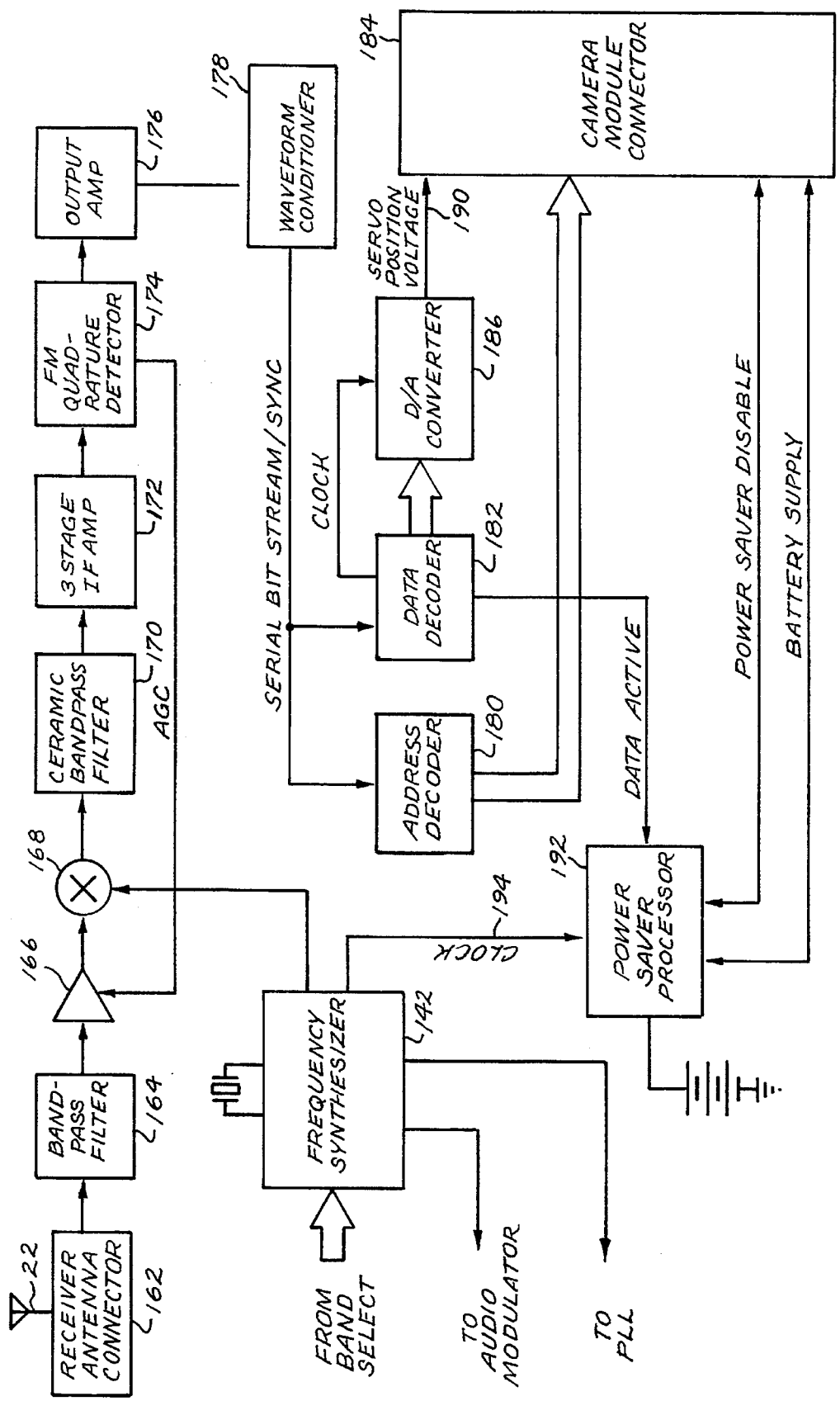

INFRARED SYSTEM

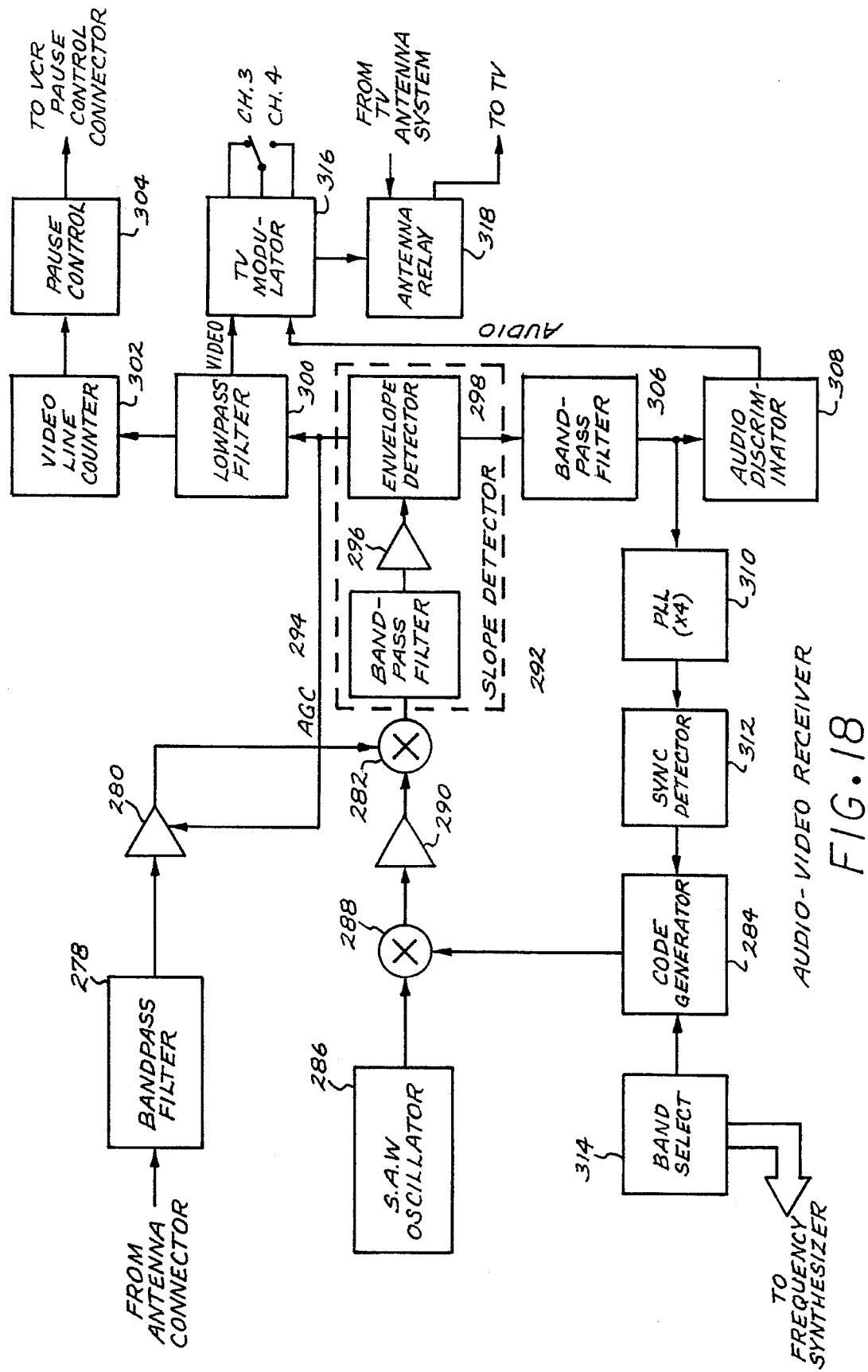

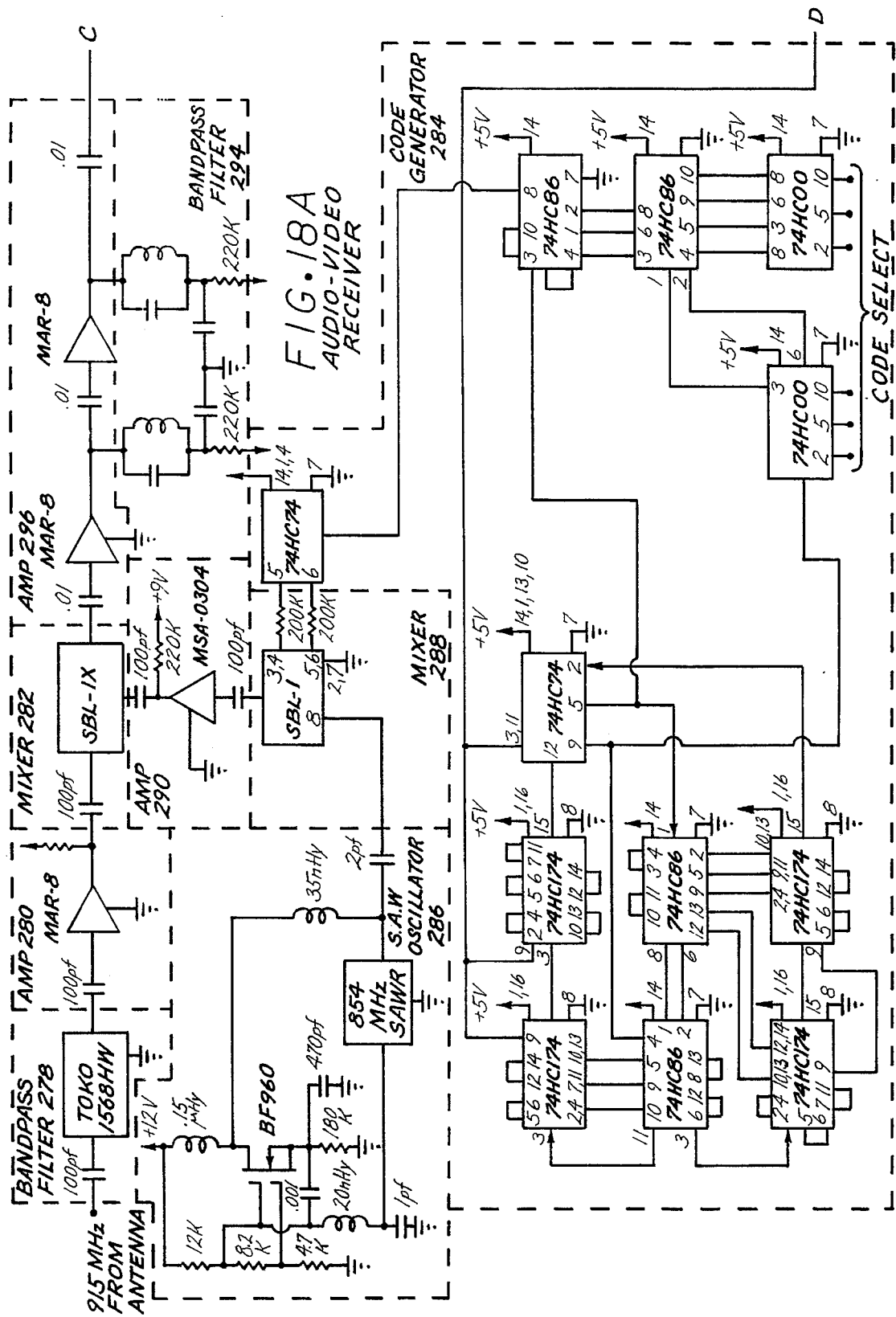

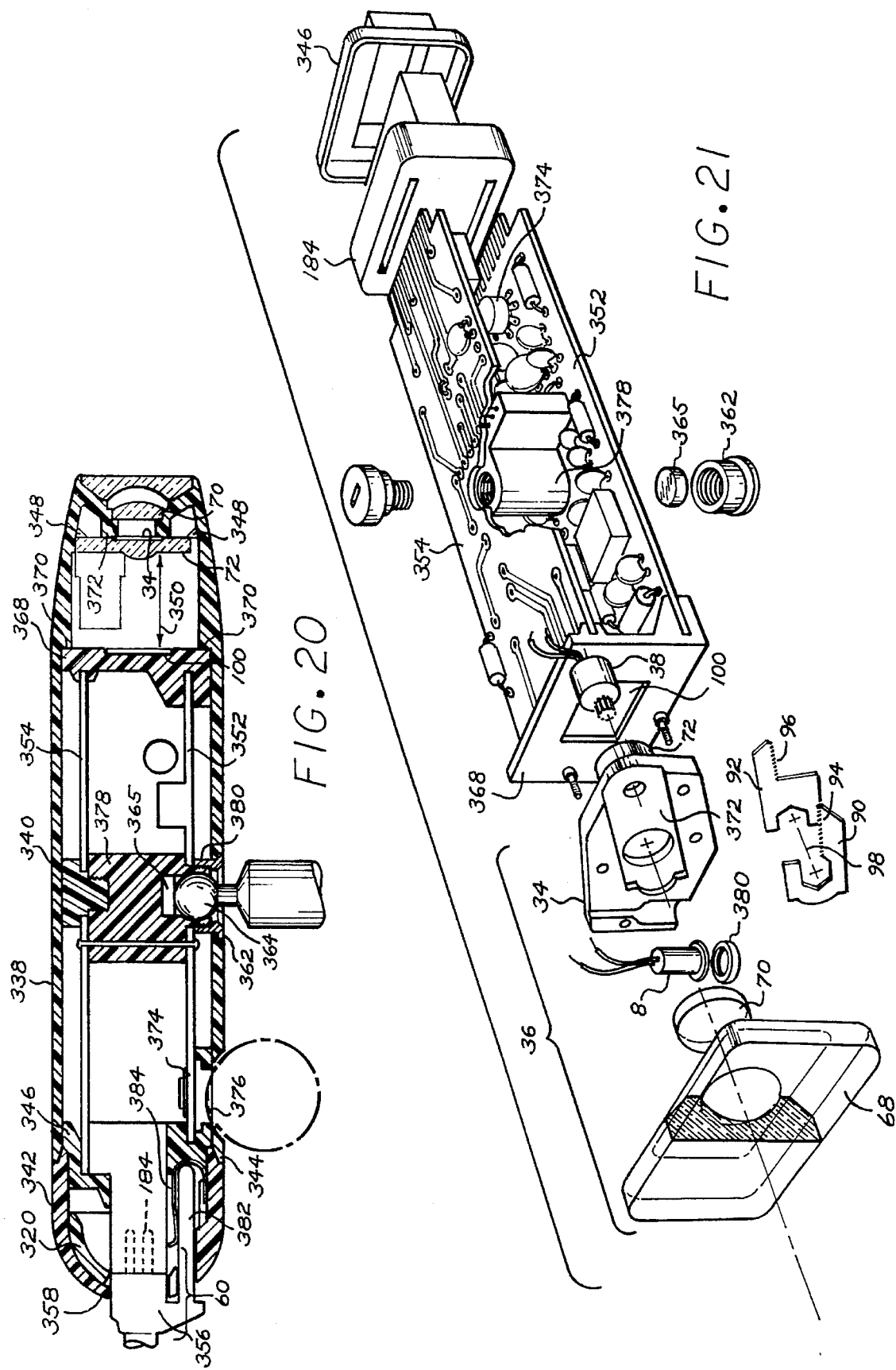

REMOTELY CONTROLLED VEHICLE CONTAINING A TELEVISION CAMERA

This application is a continuation of Ser. No. 08/097,094, filed Jul. 23, 1993, now abandoned, which is a continuation of Ser. No. 07/793,258, filed Nov. 12, 1991, now abandoned, which is a continuation of Ser. No. 07/593,100, filed Oct. 5, 1990, now abandoned, which is a continuation of Ser. No. 07/022,019, filed Mar. 5, 1987, now abandoned.

BACKGROUND OF THE INVENTION

Radio controlled toys have become popular as a means of increasing the realism and pleasure derived from powered models. These toys have generally been guided by the operator who manipulates the controls of a control console while observing the toy, thereby transmitting control signals to a receiver located in the toy which, in turn, operates servo motors connected to the operating parts of the toy. Since economy of construction, ease of manufacture and robustness are extremely important in the toy market, many methods have been sought to produce radio controlled models that offer the desired performance at a low cost to the purchaser. Often these toys have taken the form of models that are attached to the control console by an umbilical cable that operates the model through either electrical or mechanical signals, thereby avoiding the licensing requirements, expense and complexity of a radio transmitter and receiver. High performance models and those which cannot conveniently be operated by use of a umbilical, such as flying models and automotive models, have often been configured with transmitters and receivers using the 27 megahertz (MHz) and the 72 and 75 MHz citizen bands used for more elaborate model aircraft and other communication purposes. Therefore, there has been a wide range of models and control schemes developed for such toys and they have enjoyed substantial and increasing success in the marketplace.

There are many problems with radio controlled models constructed according to the prior art. For example, the scale speeds with which small models travel are often not realistic, since when the models are configured to move about the play area at visually interesting speeds, such speeds translate into very high scale speeds for the model. Thus, the model dynamics are not realistic in a scale sense and the control inputs produce exaggerated movements. Regardless of the accuracy of detail, performance or control, such models have never before created the illusion to the operator that he is a part of the machine and manipulating the controls.

Radio controlled TV guided aircraft and missiles have been produced for the military and NASA, but for purposes other than creating an illusion or entertainment for the operator. These systems have been characterized by very high costs of development and manufacture that have prevented any reasonable use of such systems in model aircraft, not to mention the intensely cost competitive toy market. Furthermore, since the purpose of such large scale vehicles has been for long range surveillance and accuracy in information gathering, the intentional distortion of the visual environment through the use of optics, which in toy scales "simulate" reality, have been neither necessary nor desirable.

Another problem with conventional remote control toys is the so called "control reversal problem". This problem is manifested when the action of the toy, from the point of view of the operator, is dependent upon the direction of travel of the toy relative to the operator. Since the operator can properly operate the controls of the toy only when it is in his field of view, and because this operation requires a mental transposition of the operator to the toy centerline looking forward, in order to determine the correct control inputs, it is a procedure which is particularly difficult for small children who are unable to understand or embrace the concepts involved, and therefore limits the potential market for such a toy.

Thus, there is a need in the toy and models field for a quantum leap in realism that will provide the operator of the toy with the impression that he is flying or driving the vehicle himself rather than being a detached operator of the powered toy he sees moving about before him and which will ease control interactions while still being inexpensive enough to be usable in a toy for mass merchandising.

SUMMARY OF THE INVENTION

The present invention is a radio-controlled television-guided toy that provides heretofore unachievable levels of realism and enjoyment for the operator. Previous radio controlled models have provided control of the orientation and velocity with which the model is driven with various degrees of accuracy, depending on the sophistication of the control systems employed and the accuracy of the model, but have always remained a mere model, with exaggerated movements, manipulated by an external observer. These facts, coupled with the scaling effects and control reversal problems well known with such models, have limited their appeal and relegated their use to relatively sophisticated model hobbyists. The toy market generally is less sophisticated and is composed of younger children than model hobbyists. For these reasons, toys must be less expressive and more appealing to a younger user than the more sophisticated models that are familiar to the model hobbyist.

Television-guided aircraft, weapons and vehicles have been constructed, but have been characterized by extraordinary complexity, sophistication and cost and the systems and components developed for that use have not been suitable for the radio control model market, let alone the highly competitive and cost conscious toy industry.

The present invention is configured to utilize a small number of key components that can be used for a variety of applications in toys. These components are a camera module, a TV module, a control module and a shell of a toy in which the camera module is housed. The camera module, when housed in the toy shell, provides a point of view from the toy that is transmitted as a signal via an antenna on the toy to the TV module, which incorporates a receiver capable of receiving the signal transmitted from the camera module and converts the signal received to video and audio signals that may be played on either a conventional television set or a TV system incorporated into either the TV module or the control module. The control module contains controls that may be manipulated by the operater to direct the action of the toy in response to the view from the toy presented on the TV screen. The control console signals may be sent from the control console via electrical wires or by an infrared remote transmitter-receiver system. The camera module is a compact structure that integrates a unique combination of a low cost, compact television camera of unusual configuration, a radio control receiver, and an audio-video transmitter into a robust removable module, that can be easily mounted into a variety of toys. By use of this system, the invention produces pleasurable simulations of operation of the toy by the operator as though he were inside of and operating the toy.

Thus, the invention provides the first means available to simulate a point of view from a toy, including, optionally, a view of portions of the toy itself and a means to convey that view to a child operating it. Due to its lens and camera design, the invention also provides a unique point of view for the operator which allows a realistic impression of scale speeds at slower toy speeds, thereby decreasing the required play area and model speed required. Since the invention allows toy models to be operated at slow speeds, the risk of damage from impact is greatly reduced and the size of the play area and size and complexity of the car can also be reduced while retaining the thrill of operation due to the view provided. The invention achieves this realism while satisfying the requirements for low cost, ease of manufacturability and simplicity of operation that are crucial in the toy industry.

In order to satisfy the important requirements of economy and ease of operation, the camera module sub-system for use in the toy is configured as a single module incorporating a television camera with an associated special lens system, a microphone, an audio-video transmitter, a radio control receiver and an internal connector, all encased in a capsule that may be easily installed in a snap-in manner in any of a number of toy configurations without any modification to the module. The camera configured for the camera module is an advanced design incorporating an imaging charge-coupled device (CCD) focal plane and a lens of wide angle and large depth of field configuration, the parameters of which have been specifically optimized for this application. The radio control receiver and the audio-video signal transmitter are incorporated in a combination of custom integrated circuits on circuit boards mounted in the module. The radio control receiver can also incorporate control algorithms designed to enhance the performance and realism of the model's operation.

The TV module contains an antenna capable of receiving the audio-video signal transmitted from the toy. This signal incorporates the video and audio signals derived from the camera and microphone, respectively. The signal from the receiving antenna in the TV module is conducted to a receiver that separates the audio and video signals and transmits them to a television set associated with the module or to the audio and video outputs. The TV module also accepts signals from a control module that converts manual inputs by the operator into signals that represent the input positions of the controls.

These signals are then transmitted by a radio control transmitter and transmitting antenna in the TV module to a receiving antenna on the toy. Either the control console incorporating controls manipulated by the operator or the TV module may incorporate a television monitor or, alternatively, the system may use any of a variety of readily available TV sets or monitors, including those normally available in the home. Thus, the communications system provides means to both transmit and receive control signals and transmit and receive video and audio signals associated with the view and audio environment from the television camera and microphone in the camera module mounted in the toy. While the video transmission is very important to the enjoyment of the toy, the transmission of the audio environment has an important contribution to the enjoyment and realism of the invention as well, since it provides real time feedback of acceleration, deceleration and speed cues to the operator based upon sounds generated by the toy's motor and drivetrain as they interact with the environment.

In practice, all of these transmissions may be made on separate frequencies, on various bands of a single FCC approved radio frequency or, in the alternative, by time shared or spread spectrum transmissions on a number of frequencies. A special system to take advantage of a novel spread spectrum transmission scheme has been developed for the invention and is described below. An alternative transmission scheme may involve the use of infrared radiation with suitable emitters placed on the mobile toy and receivers placed on movable pylons in the play area that are wired to the control console. Use of an infrared transmission scheme avoids the necessity of FCC certification for the operation of the toy and also decreases the toy's susceptibility to stray electro-magnetic radiation in the environment. When an infrared transmission system is used in circumstances where the toy is out of the line of sight of the receiver associated with the TV console, and where IR light cannot reliably be bounced off of surrounding surfaces without degrading the signal, repeater transmitter-receivers may be placed about the play area at intermediate positions on the path between the toy and the control console to assure reliable communication between the control console and the mobile toy.

The TV camera of the present invention is mounted in a module that contains, in addition to the TV camera, a microphone with associated audio circuits, a transmitter operation to transmit a composite audio-video signal to the TV module and control system circuits that operate servo mechanisms in the toy in response to control signals transmitted from the TV module and received at the toy by a radio frequency receiver in the camera module. The modularization of this package provides a number of benefits; it allows the rapid and easy transfer by a child or other unskilled operator of the most complex elements of the system, the camera, receiver-transmitter and control system, from one toy to another; allows for the encapsulation of these critical components in a robust and water resistant package; minimizes and consolidates the external connections to the various components in the toy; and simplifies manufacture of toys that use the module. External connection of the camera module to the toy is accomplished by a connector mounted in a portion of the module that interfaces with the toy and a mating connector mounted in the toy. A spring-loaded door or similar mechanism may be used to protect the camera module connector when it is not mounted in the toy and to rotate away from the terminals of the camera module connector when the camera module is inserted in the toy.

Whether the transmitter-receiver subsystem is mounted within the camera module or in a separate module in the toy is a matter of design choice based upon the mode of data transmission chosen. For instance, if infrared transmission is chosen, it will be advantageous to locate the transmitter electronics close to the emitter on the toy, since the conversion from electronic signal to infrared signal may not be desirable in the module due to the difficulties of transmitting an optical signal across the interface between the module and the toy. Similarly, if a low power electronic transmission scheme is to be used, it may be advantageous to locate the transmitter close to the antenna to prevent an unacceptable signal loss of the low strength signal at the interface between the camera module and the toy. Alternatively, if a relatively high power electronic transmission system is used, it may be possible to use a transmitter in the camera module, since the losses at the camera module terminals will be relatively unimportant.

The television camera of the present invention has a number of features that are different from conventional practice in order to adapt the technology available to the requirements of the present invention. For example, the lens system of the present invention is designed to visually increase the size and scope of the play environment by "miniaturizing" the point of view of the operator and thus enhance the illusion of speed and involvement of the operator compared to the actual velocity of the toy. In practice, the lens system of the present invention is a wide angle, short focal length system that accentuates the apparent angular speed with which objects in the periphery move. Wide angle lenses permit substantially greater depth of field at a given aperture than normal lenses. As a result, the system of the present invention obtains acceptable image sharpness from a few inches to infinity without having to focus the lens or reduce the aperture size. A human eye seems to have a great depth of field because of its ability to constantly and rapidly refocus. The present invention reproduces on a TV screen what the human eye perceives as reality.

Thus, the operator will be provided with a representation that scales to that which a human would see in a larger vehicle operating at a higher speed. The wide angle field of view also dramatically lessens the apparent effect of vibration, an extremely important factor due to the scale effects between the vehicle and the surfaces on which it runs. The lens is of the auto-iris type to provide automatic exposure control when combined with a means of sensing the ambient lighting conditions. In practice, such light sensing can either be a photodetector or a circuit to detect the light energy sensed by the camera focal place. The camera utilizes a charge-coupled device (CCD) imaging focal plane in order to provide an economical, rugged and easily fabricated camera system that is appropriate to the structure of the balance of the invention and such a focal plane is also ideally suited to such an auto-iris scheme.

Those skilled in the art will recognize that it was the goal of previous vehicle mounted camera systems to provide views that were primarily in true perspective or telephoto in nature due to the surveillance requirements of the systems, the high speed with which they traveled, or the necessity to maintain true perspective in the field of view. The present invention seeks just the opposite effect. Here, it is desirable to "take a doll house and make it look like a real house" or "take a view from a miniature, slow-moving car and make it look like a full size, fast moving car". By adaption of this unique and novel approach and the developments of a special configuration of camera and lens to capitalize upon the concept, unexpected and novel effects are created that make the invention a breakthrough in the radio controlled toy field.

From the above summary of the invention, it can be seen that the present invention achieves results unavailable in the art by the adaption and modification of certain available components, the development of specialized components where required and integration of the sum of the components into a robust and compact system that meets the stringent cost and manufacturability requirements of the toy industry.

By providing a highly realistic and enjoyable operation of a toy vehicle by a human operator through creating the sensation that the operator is actually inside of the toy and directly manipulating the controls of a vehicle, the present invention substantially enhances the pleasure to be derived from radio controlled toys. Other objects and features of the invention will become apparent from consideration of the following detailed description, taken in connection with the accompanying drawings which illustrate, by way of example, the structure and operation of the invention.

BRIEF DESCRIPTION OF THE DRAWINGS

FIG. 11 is a schematic block diagram of the audio-video transmitter of the camera module of the present invention.

FIG. 11A,B is a schematic block diagram of the prototype audio-video transmitter system of the present invention.

FIG. 12 is a schematic block diagram of the radio control receiver of the camera module of the present invention.

FIG. 20 is a cross section of the camera module of the present invention, illustrating the arrangement of the electronic, mechanical and optical components within the module.

FIG. 21 is an exploded, perspective view of the camera module illustrating the arrangement of the major optical, electronic and mechanical components of the camera module.

DETAILED DESCRIPTION OF THE INVENTION

Figure 1:
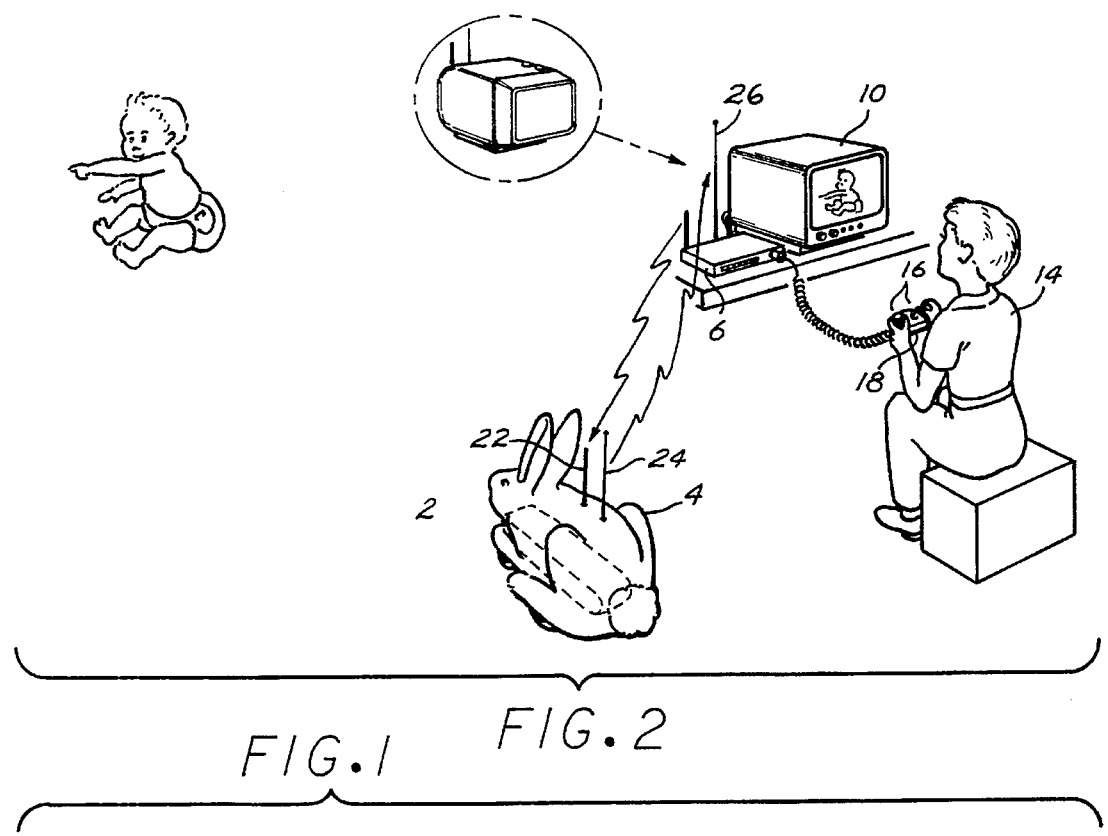
FIG. 1 is a perspective overall view of the basic components of the invention arranged in a play area.

As shown in FIG. 1 of the exemplary drawings, the invention is embodied in a rugged, compact camera module 2 mounted in a radio controlled toy 4 that is controlled from a TV module 6. The TV module 6 sends signals corresponding to images and sounds received by the camera module 2 to a television monitor 10. The human operator 14 thus is able to control the motion of the toy 4 in response to the video picture presented on the monitor 10. To accomplish control of the motion of the toy, the operator 14 operates the hand controls 16 on control modules 18. The control module communicates control system signals via a transmitter in TV module 6 through a transmitting antenna 20 to a receiving antenna 22 in toy 4. Camera module 2 incorporates all of the necessary subsystems required to convert the video image generated by the camera and the audio signal picked up by microphone 8 into a signal suitable for transmission via antenna 24 to receiving antenna 26 on TV module 6. Toy 4 includes servo mechanisms and control motors that both move and control the direction of the toy 4 in response to commands from the control system receiver in camera module 2.

Previous radio controlled toys have been operated by a human operator in response to observing the motion of the toy before him. While this has been a widely used and pleasurable pastime, an essential element of realism associated with actual manipulation of the vehicle has been missing, since these previous toys have not presented the ability to observe the dynamics of the vehicle from the point of view of an operator "inside" it. Thus, many otherwise pleasurable and thrilling aspects of vehicle operation have not been available in previous toys.

For example, details of small scale models are not readily visible when they are any significant distance from the operator and in order to provide reasonable speed and motion compared to the observer, the model operates at rates that are grossly out of scale with the model. Furthermore, these speeds mean that a very large play area is generally required and the toys are susceptable to damage and wear and tear from high speed impacts with surrounding objects.

The external, remote "point of view" of such toys also introduces problems with control for younger operators. for example, the operator must transpose his actual orientation into a "forward looking" orientation before he can manipulate the controls, a very confusing problem if the operator is not capable or experienced in the operation of such toys or if the toy is at a distance so that the precise orientation is not easily discerned. The operation of such scale radio control vehicles is not only unrealistic from the point of view of the observer due to the scale effects and control reversal problem, but is also lacking in the intimacy with the play environment that is so appealing to younger children. As a result and due to the relatively high cost of radio control components, radio control models have generally only been part of the relatively high priced model industry and have not had a significant impact on that part of the toy market oriented towards younger children.

The use of television systems in vehicles has primarily been relegated to very expensive military and commerccial systems designed for surveillance in remote locations and for other specialized applications. In general, such systems have been designed to visually capture and return a point of view only, with the subject of the imagery representing the entire objective of the mission. The vehicles used in such missions are full scale, extremely complex systems operating at predetermined and precise ranges and speeds in order to acquire radar imagery or accurate photographic data through close-up telephoto means and then to return that data via transmissions or internal data storage devices. Such missions are executed with a clear emphasis on the information gathered, rather than on the real time feedback of audio environments or visual effects that involve the vehicle as it interacts with its environment, or with other vehicles, such as is anticipated with toys.

Furthermore, military, commercial and research systems have been configured to depict subject environments as accurately and faithfully as is technically feasible, rather than to intentionally alter the perspectives of environments for the purpose of creating special effects, expanded scope (play area) or the simulation of speeds through enhancement. In addition to being produced and operated at levels of cost and complexity that are totally inappropriate for the toy mass market, such vehicle systems have been intended solely for the purpose of conveying high-technology imaging and sensing systems to predetermined locations where it is inconvenient, dangerous or impossible to have a human operator involved; and once such imaging or sensing is obtained, the vehicle itself is frequently expendable. The present invention provides a means for bringing the personal sensation of operation of a full size vehicle to the toy market at modest expense and with a simple and robust product configuration.

Figure 2:
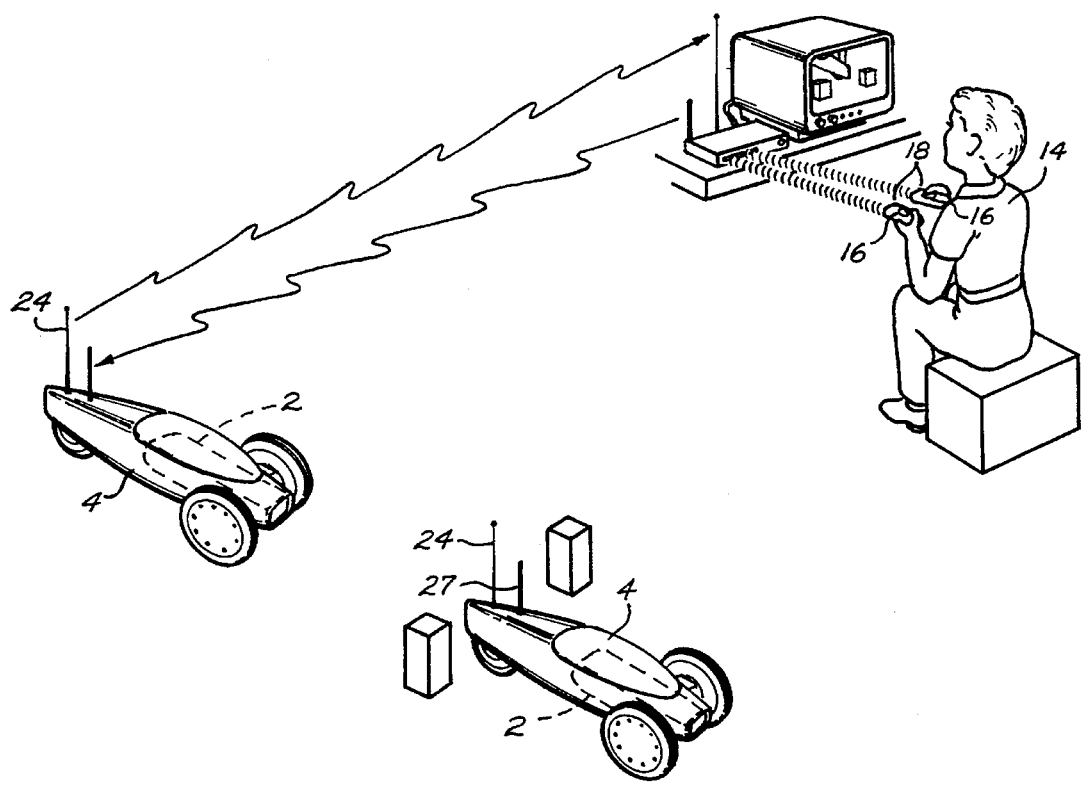
FIG. 2 is an overall perspective of an alternate "watch pet" toy incorporating the invention.

FIG. 2 illustrates another one of the many ways in which the present invention may be implemented in the domestic environment. In this embodiment, the television camera module 2 is contained in a vehicle 4 that resembles a pet, in this case, a small rabbit, thereby providing a "watch pet" 4 that may be used for the remote observation of a child or other important part of the operator's surroundings. Such a vehicle also represents a non-threatening toy for infants and young children and because of its human operator, appears to exhibit genuine intelligence. Similar to the vehicle described in FIG. 1, the "watch pet" 4 contains a camera module 2 that includes subsystems that encode the video signal for transmission by an antenna 24 to receiving antenna 26, the TV module 6 and means to receive control system signals via antenna 22 from the transmitting antenna 20 of TV module 6 and pass these signals on to servomechanisms in the "watch pet" 4 to control its movements. As an alternative configuration of the invention, the TV set can be incorporated into either the TV module or control module. The inset in FIG. 2 illustrates a system in which the television set 10 is incorporated into TV module 6.

In order to provide the benefits of the present invention, it was necessary to configure the components in ways not normally used for other applications. These configurations were designed to address the difficult environmental problems presented by use in toys and the cost and manufacturabiliy constraints associated with producing such toys for the competitive market, as well as the unique operational requirements of the invention.

Figure 3:
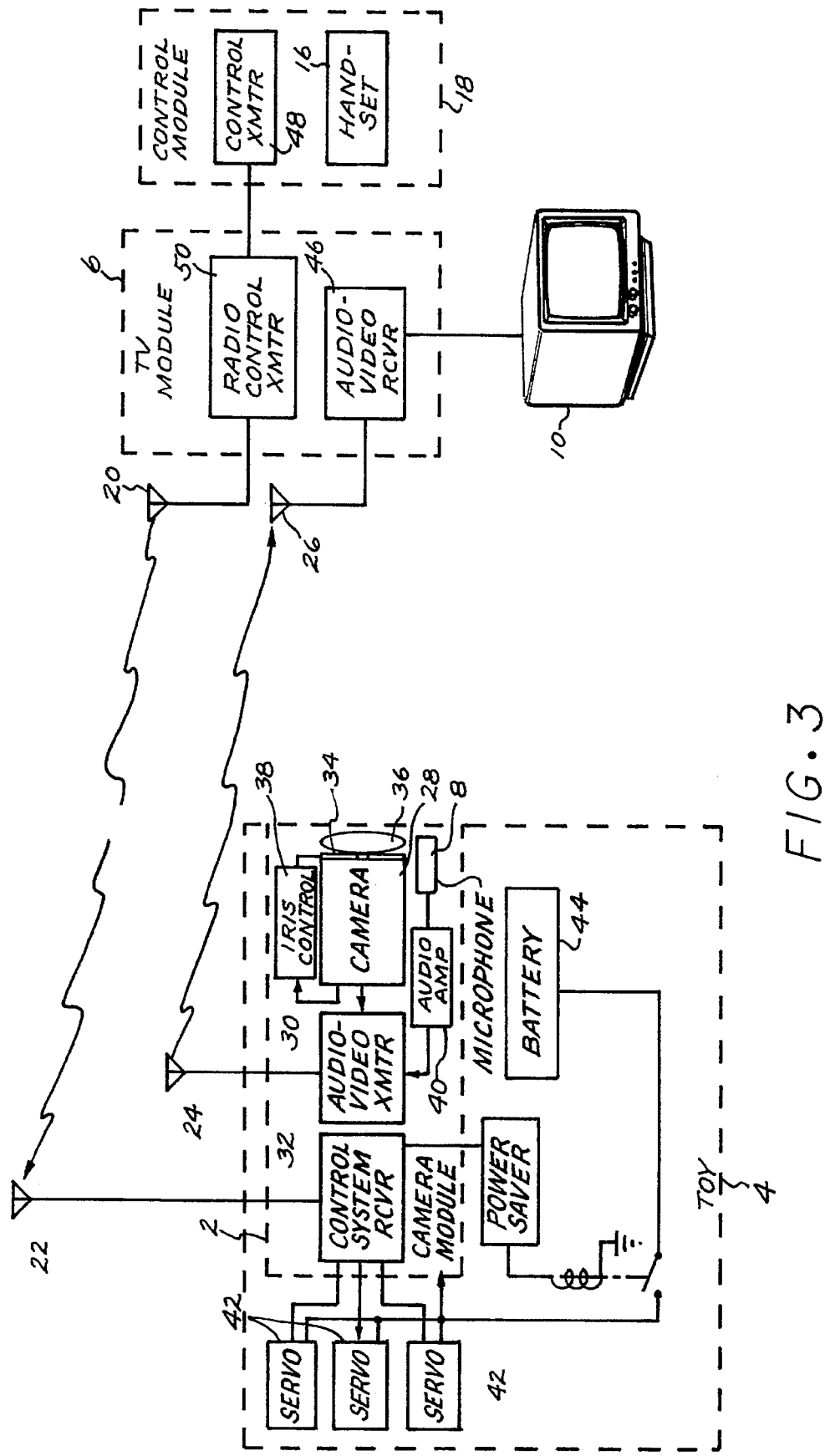
FIG. 3 is a schematic of the basic arrangement of the components of the invention illustrating the transmission links and major components of the invention.

FIG. 3 illustrates in diagramatic form, the basic systems associated with the present invention. Toy 4 contains camera module 2 that incorporates the video camera system 28, an audio-video transmitter 30 and a control system receiver 32. The video camera 28 converts the visual scene before the toy received via lens 36 through iris 34 to an electronic signal that is then encoded by the audio-video transmitter 30 for transmission to the transmitter antenna 24. The video camera 28 incorporates a number of features designed to exploit the capabilities of available technology and optimize them for this specific application. For instance, the camera 28 incorporates a wide angle lens 36 that provides the benefits of increasing the sensation of scale speed while diminishing the effects of vibration upon the scene being transmitted. The camera incorporates a simple auto-iris system, consisting of iris 34 and iris control 38, adequate for the purposes of controlling exposure in a toy such as the present invention and also provides a miniature microphone 8 and audio amplifier system 40 to simultaneously transmit an audio signal of the environmental sounds near the toy over the same transmission link as the video. The camera module 2 also contains a control system receiver 32 that receives control signals from receiving antenna 22 and after decoding, sends these signals to servos 42 that operate components of and move the toy in response to the signals. Battery 44 provides the necessary electrical energy to operate all of the electronic and electromechanical subsystems in the toy.

TV module 6 contains an audio-video receiver 46 that receives the radio frequency (RF) signal transmitted from the transmitting antenna 24 on toy 4 and after decoding, transmits this signal to a conventional television set 10 where the video picture is displayed and the audio signal is reproduced. In response to the image viewed on the television system, the human operator 14 manipulates a control handset 16 in control module 18 that feeds control signals via control transmitter 48 to radio control transmitter 50 and transmitter antenna 20. Thus, the actions of the operator on the handset 16 control the operation of toy 4 as described above.

The RF system of the present invention represents a new approach to short range television transmission that has been greeted with approval and encouragement by the Federal Communications Commission (FCC). This RF system utilizes a spread spectrum transmission scheme in order to provide television transmission utilizing portions of the electromagnetic spectrum that are not currently used. In response to encouragement by the FCC, the inventors have developed this system to avoid using the conventional techniques that have already placed such a burden on the transmission frequency spectrum available for non broadcast use. This system, which will be described in more detail below, incorporates a direct sequence spread spectrum modulation of a carrier, the modulation of which is varied by the product of the baseband composite video and the frequency modulated audio sub-carrier signal. The carrier used is in the 902 to 928 MHz frequency band and the resultant signal provides a low interference method of transmission. Other benefits and features of this scheme will be apparent from the detailed description below.

FREQUENCY MODULATED DIRECT SEQUENCE (FMDS) SIGNALS

Frequency modulation (FM) of a direct sequence (DS) electro-magnetic signal produces a combined spectrum that is the convolution of the FM and DS signals. That is, the normal direct sequence $$\left(\frac{\sin x}{x}\right)^2$$

power distribution is shifted in its entirety as the carrier center frequency is shifted by the frequency modulation. The composite signal may be expressed as $$A \cos(w_c \pm w_m)t \pm 90°$$

where the $w_c \pm w_m$ term is the (narrowband) FM and that, in turn, is biphase modulated by the direct sequence code. The spectrum therefore has a $$\left(\frac{\sin x}{x}\right)^2$$

distribution that is broadened an amount equal to the deviation of the frequency modulated carrier. With an 18 Mbps code, the natural direct sequence bandwidth (3 dB) is slightly less than 16 Mhz with an FM deviation-of ±900 Khz (B=0.2) the 3 dB bandwidth can be expected to be expanded to approximately 19.6 Mhz, allowing for two significant FM related sidebands. This means that the resultant overall spectrum will be in a form similar to that described below:

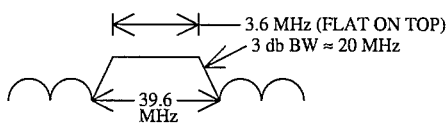

DIRECT SEQUENCE MODULATION

The term "direct sequence" modulation is used herein to describe carriers that are modulated by a code sequence for the purpose of spreading the transmitted energy over a wide bandwidth. The modulation format used, which may be chosen from several formats (i.e. BPSK, OPSK, OQPSK or MSK) is identical to the format(s) used in data transmission systems, with the exception that data modulates the carrier in a data transmitter and a code replaces the data in a direct sequence system. The specific direct sequence method chosen for use in the present invention is biphase modulation (BPSK) by an 18 Mbps code sequence. An expression for this simple modulation format is $$A \cos w_c t \pm 90°$$

where wc is the carrier rate, A is the amplitude and the +90° or −90° term defines the code modulation. Using this scheme, the code (which is a binary stream) causes the carrier to be at +90° when a "One" is sent and at −90° when a "Zero" is sent. With BPSK modulation by an 18 Mpbs code, the frequency spectrum produced has a power distribution that is $$\left(\frac{\sin x}{x}\right)^2$$

with a main lobe bandwidth of 36 Mhz (null-to-null) and a 3 db bandwidth of 15.84 Mhz. This is illustrated below:

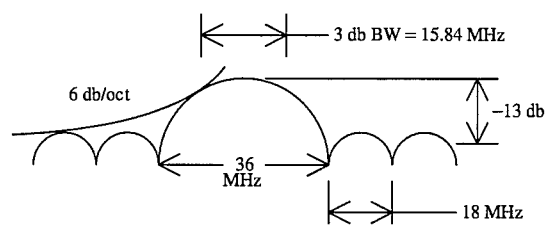

Within the envelope shown, the signal is noiselike and has a lower power density which is approximately:

$$\frac{P_{out} \text{ (watts)}}{36 \times 10^6 \text{ (Hertz)}} = \text{Power Density}$$

Those skilled in the art will realize that the above FMDS concept represents a novel approach to use of the RF spectrum for the purposes of video transmission and that such schemes may have broad uses in other systems. In the present system, it presents many advantages since it makes use of the RF spectrum in a way that does not intrude on other important uses of the same parts of the spectrum, an important consideration for a mass produced toy.

The video transmission link of the above system may incorporate, as an alternative to a radio frequency transmitter and receiver, an infrared transmitter and receiver that avoids the issues associated with RF interference and procurement of approval by the Federal Communications Commission of the electromagnetic transmission characteristic of the system. Both the radio frequency and infrared video transmission systems will be discussed in detail below.

Figure 4:
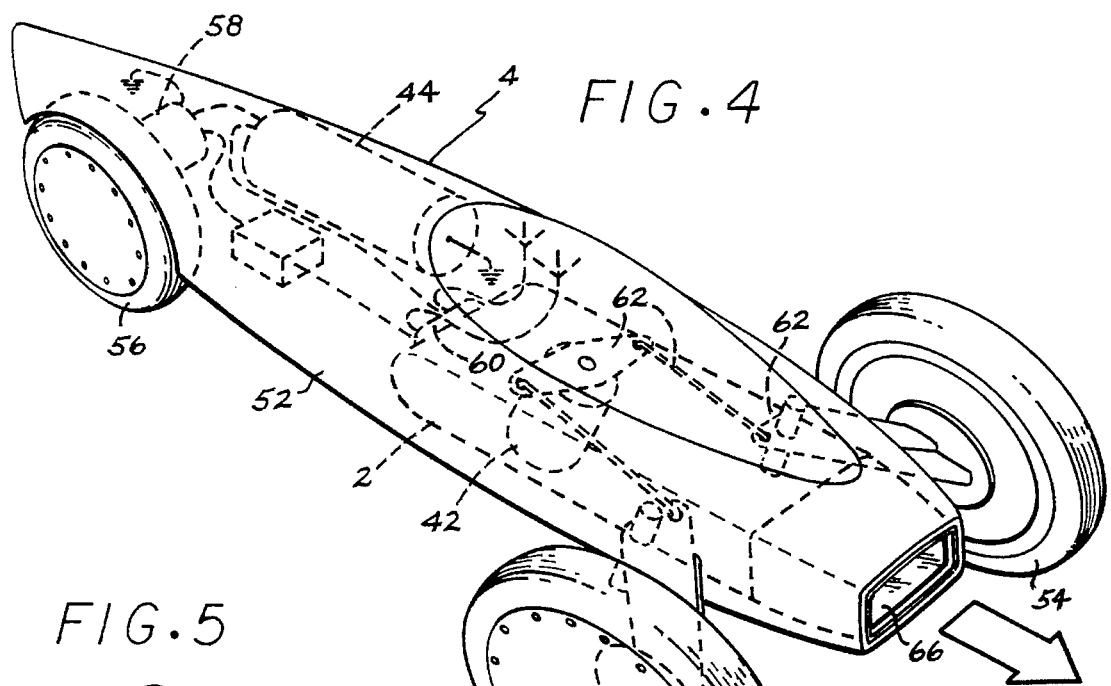
FIG. 4 is a phantom perspective of a toy incorporating the camera module of the present invention.

FIG. 4 is an illustration of a toy according to the present invention, showing the arrangement of the various components. The toy illustrated is a three-wheeled vehicle 4 which incorporates a chassis 52 upon which two steering wheels 54 are mounted and a single drive wheel 56 is also mounted. The drive wheel 56 is powered by a motor 58 driven from battery 44. Camera module 2 is mounted in chassis 52 and forms a connection with connector 60 which provides power to the camera module and a connection with the other subsystems of the toy. The toy further contains servos 42 which provide control signals to the steering gear 62 for steering wheels 54 and motor control signals for motor 58 operating off of battery 44 to drive drive wheel 56.

CAMERA MODULE

Figure 5:
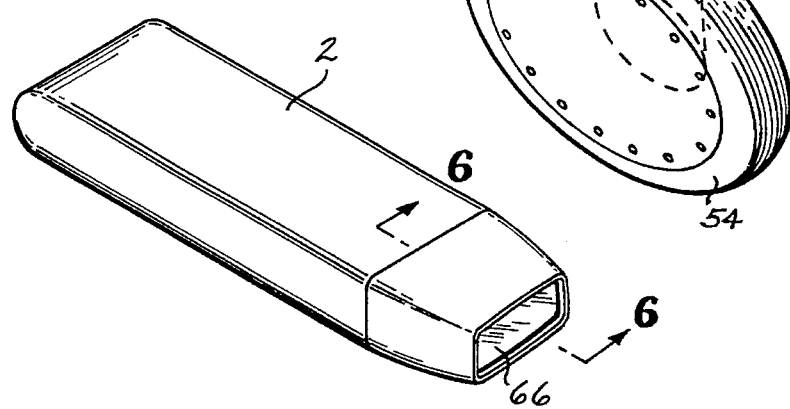
FIG. 5 is a perspective of the camera module of the present invention showing the basic arrangement of the encapsulation configuration.

Referring to FIG. 5, the camera module 2 is an important feature of the present invention, since it forms the basis for many of the special purpose subsystems used in the invention and allows the rapid and simple switching of the major components that it incorporates between various toys to increase the utility of the invention. The camera module 2 is designed to perform the following functions of the invention:

1) reception of a visual image and conversion to a television compatible video electronic signal,
2) reception of ambient sound signals and conversion to an electronic audio signal,
3) creation of a composite radio frequency signal incorporating the video and audio signals described above,
4) reception of conventional radio control servo control signals from an antenna mounted on the toy,
5) conversion of the radio control digital servo signals to analog control voltages suitable for control of servomechanisms to drive the toy and control its movements, and
6) selection of the audio-video transmission and radio control receiving channel.

As shown in FIG. 5, camera module 2 incorporates an objective lens 68 that is part of the lens system 36 and an adjacent microphone (not shown) in the forward facing portion of the camera module. The camera lens and focal plane is housed between objective lens 68 and the internally mounted electronics. The video camera electronics, including the audio-video transmitter 30, the control system receiver 32 and the audio amplifier 40, is housed inside of the module, which may in turn, be easily inserted into the appropriate space in any of a number of toys designed to accommodate it.

LENS SUBSYSTEM

The present invention, designed to enhance the realism associated with operating miniature toys in a scale environment, makes use of a wide angle, large depth of field lens that improves the sensation of scale speed during operation of the toy and also minimizes the effects of vibration inevitably encountered due to the relative size of the toy's wheels and the surfaces on which such a toy is typically used.

Figures 6, 8:
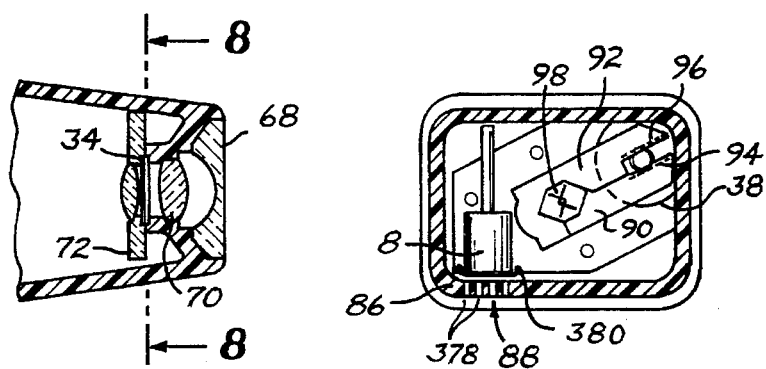
FIG. 6 is a cutaway at 6—6 of FIG. 5, illustrating a cross section of the camera module lens and iris system incorporating a relatively simple three element lens.
FIG. 8 is a cross section at 8—8 of FIG. 6, illustrating the auto iris system and the microphone arrangement of the present invention.

FIG. 6 illustrates a lens subsystem 36 of the type used in the present invention when relatively low quality optical performance is acceptable. Lens 36 incorporates three lens elements 68, 70, 72 that may be made of premolded plastic in order to provide the wide angle capabilities desirable in this lens, while retaining acceptable optical performance for applications such as black and white TV. The iris system 34 is operated in response to a photodetector which may be incorporated in the camera module body. Alternatively, the auto iris system incorporating iris control 38 and iris 34 may be driven by a signal from the focal plane responsive to the light level falling on the focal plane.

Figure 7:
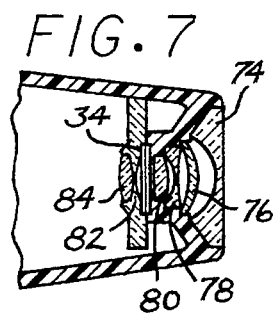
FIG. 7 is a section at 6—6 of the camera module of the present invention illustrating a six element lens of the type used for more optically demanding applications.

FIG. 7 illustrates a more complex lens suitable for applications of the toy in which a higher quality optical performance is required such as for color TV when color correction is required. Six element lens 36 containing lens elements 74, 76, 78, 80, 82 and 84 provides functional capabilities similar to the three element lens described above, in that it provides a wide angle field of view in large depth of field. However, such a lens system also allows for the inclusion of color correction by multiple coating of the intermediate lens elements and higher resolution by spreading corrections for ray paths over a larger number of components with the resultant relaxation of the specification of the lens material. Thus, while the six element lens 36 represents higher performance, it is still easily fabricated from molded lens and represents a relativelty simple construction for the camera of the toy.

While the effect desired of the present invention may be achieved with a variety of wide angle optical systems, the effect has been found to be most interesting and pleasurable for lens systems having a field of view of approximately 150°, measured on the horizontal axis of the field of view. Other angles between approximately 120° and 170° have also been found to provide pronounced effects of the type desired here and still other angles may be desirable for certain applications. The lens system must be adapted to the requirements of the invention and in practice, it has been found that for a CCD active area of 11 mm measured on the diagonal, a lens with a focal length of approximately 4 mm produces the desired characteristics and is simple and economical to construct while providing an adequate aperture for the light requirements of the camera.

The "barrel" distortion associated with a relatively simple wide angle lens that the invention uses actually provides a reasonably close simulation of human perception in that the best resolution is concentrated in the center of field of view, just as in the human eye, while the periphery is less detailed and adds to an illusion of spread in a moving toy. Such a lens also has a greater depth of field than a "normal" focal length lens and is therefore easier to economically incorporate into a simple and inexpensive system such as the camera module of the present invention.

FIG. 8 illustrates the electromechanical auto-iris system of the present invention as viewed through section 8 of FIG. 6. Microphone 8 is located adjacent the iris and the case 86 incorporates slots 88 that provide access of outside sounds to the microphone 8. Iris 34 consists of moving blades 90 and 92 that are driven relative to one another by iris control motor 38 operating on gears 94 and 96 on blades 92 and 90. The relative motion of blades 90 and 92 alters the opening 98 thereby providing an auto-iris effect.

TV CAMERA

Figure 9:
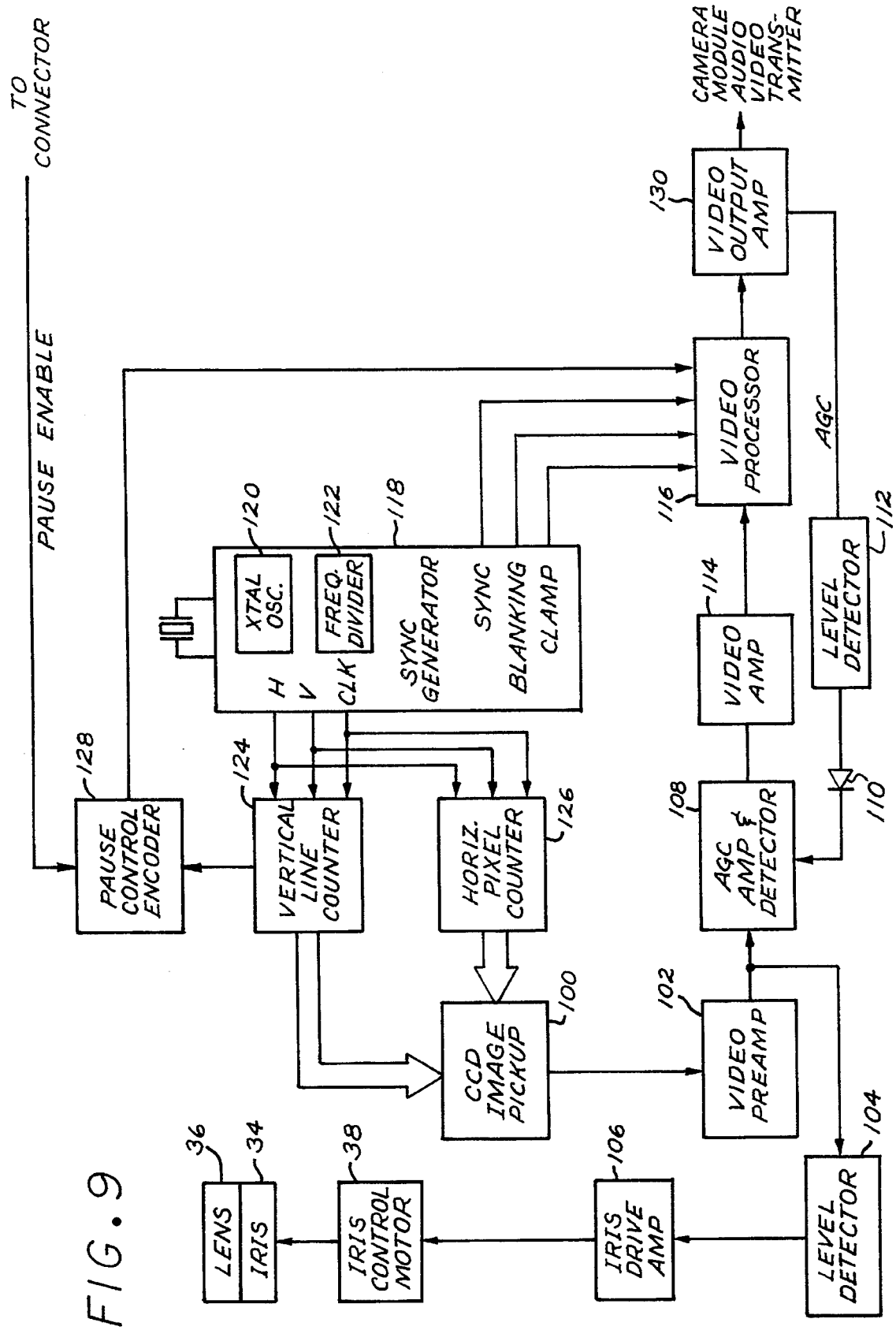
FIG. 9 is a schematic diagram of the television camera of the present invention illustrating its interface with the camera module audio-video transmitter.

As illustrated in FIG. 9, the TV camera of the camera module subsystem 2 incorporates an NTSC compatible, 525 line, 2 to 1 interlace, black and white, charge coupled device (CCD) video camera. This subsystem also incorporates means to generate an encoded control signal which can be used to control the pause control of a video cassette recorder when such a recorder is attached to the TV module.

The camera of the present invention utilizes a charged coupled device (CCD) focal plane 100 as the focal plane image conversion device. This CCD array 100 generates an analog video output signal which is amplified by a video preamplifier 102. This signal is then level detected by level detector 104, amplified by the iris drive amplifier 106 and used to power a miniature DC iris control motor 38 for automatic control of the lens iris 34 in response to light level falling on the focal plane via lens 36. The signal from the video preamplifier 102 is also fed to an automatic gain control (AGC) amplifier stage 108 which also contains a DC rectifier 110 and level detector 112 which allows control from the AGC input of the AGC amplifier 108. The output of the AGC section is amplified by a video amplifier 114 and fed to the video processor section 116. The video processor 116 formats the signal into a NTSC standard composite video signal by adding a syncronization signal, front and back porches, black clamp and timing signals. The video processor 116 also injects a peak white voltage level at video line 15 when the pause command is active.

Sync signals, clamping, blanking and timing signals are supplied to the video processor by the sync generator section 118. The sync generator section 118 incorporates a crystal oscillator 120 and frequency dividers 122 which generate horizontal, vertical and clock timing signals to the vertical line counter section 124 and the horizontal pixel counter section 126 which provide addressing to the CCD image pickup. The vertical line counter section 124 also provides line 15 active status which enables the pause control encoder section 128 when the external pause control from the camera connector is enabled. The video processor 116 output is fed to a video output amplifier 130 which also provides the feedback signal to the AGC amplifier 108. The resultant composite video signal is then fed to the input of the audio-video transmitter described below.

AUDIO DETECTION AND TRANSMITTER JUNCTION

Figure 10:
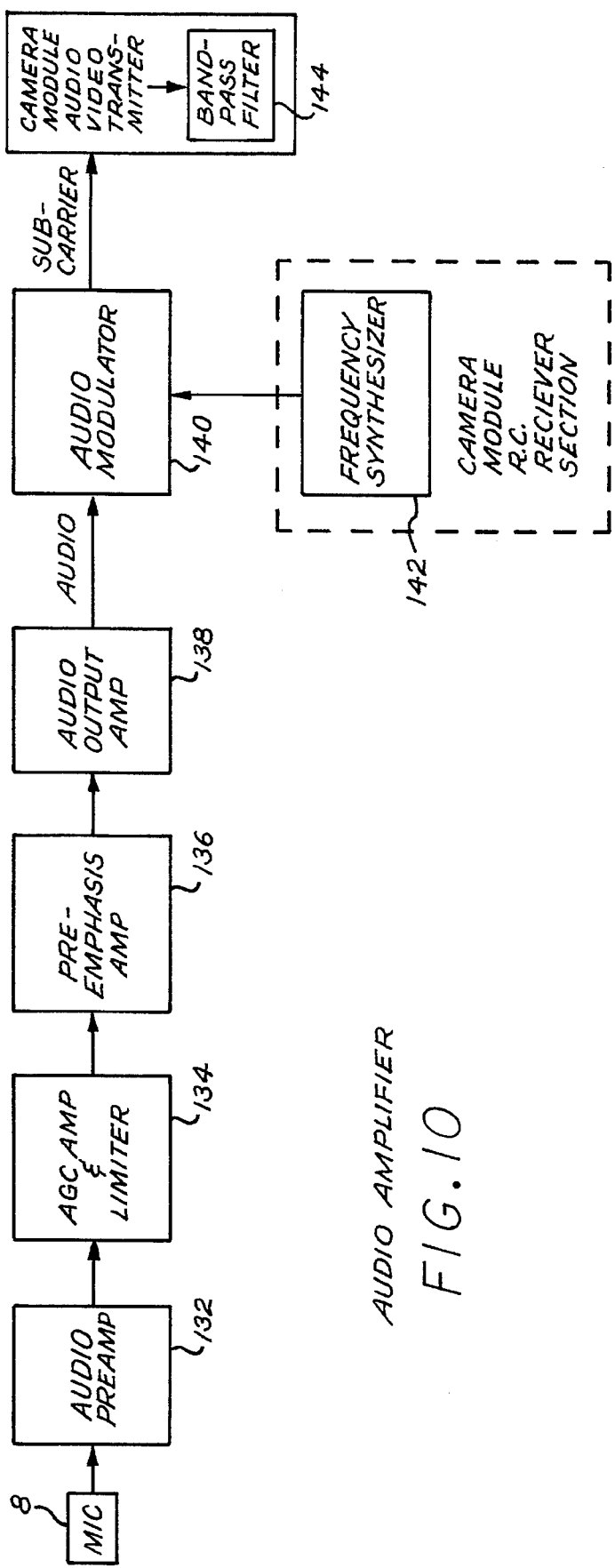
FIG. 10 is a schematic block diagram of the audio amplifier of the camera module of the present invention.

FIG. 10 illustrates the audio control amplifier 40 incorporated in the camera module 2 to provide a NTSC television quality frequency modulated audio signal on a 4.5 MHz carrier.

A miniature dynamic microphone 8 is used for sound detection and conversion to an electrical signal. This signal is then amplified by an audio preamplifier 132 and fed to an automatic gain control and signal limiting stage 134. The resultant signal is then filtered and equalized by a pre-emphasis amplifier 136 in accordance with NTSC standards and again amplified by an audio output amplifier 138 before it is fed to an audio modulator 140 centered at 4.5 MHz. This 4.5 MHz center frequency is generated by the frequency synthesizer 142 described in further detail below. The audio sub-carrier output is then fed to the bandpass filter 144 in the camera module audio-video transmitter which is also described in more detail below.

AUDIO VIDEO TRANSMITTER

FIG. 11 illustrates the audio-video transmitter 30 which is designed to provide a low-interference method of transmitting audio and video information in the 902 to 928 MHz frequency band. This transmission is accomplished by employing a unique method of modulation referred to as FMDS, whereby a direct sequence spread spectrum modulation of a carrier is frequency modulated by the product of the baseband composite video and the frequency modulated audio sub-carrier signals. The resulting spectrum of this DS/FM process is the convolution of these two forms of modulation and each individual signal spectra. This process begins by summing at summer 141 the frequency modulated audio sub-carrier through a 4.5 MHz bandpass filter 144 with the 4 MHz composite video signal filtered by lowpass filter 147. This summed output is then used as the frequency modulation signal for the phase locked loop 146 [PLL]. The PLL outputs a low-deviation-ratio frequency modulated signal (beta<0.2) centered at 72 MHz which is generated by a fourth harmonic lock of an 18 MHz frequency supplied by the frequency synthesizer 142.

This 18 MHz frequency is also used by a discrete sequence code generator 148 to generate a code which is 8191 bits long. The code generator 148 also receives a one-of-six band selection which causes the code generator 148 to output one of six different discrete sequence codes. These codes are a controlled cross-correlation or multiple access type known as "Gold" codes. The output of the code generator 148 and the output of the PLL 146 are then mixed using a balanced mixer 150 which creates a 180 degree phase shift modulation of the 72 MHz carrier. This produces a pseudo-noise wideband signal with sin x/x power distribution and average power density of less than 10 microwatts per Hz. This signal is then amplified by an IF amplifier 152 and again mixed in mixer 154 with a 843 MHz frequency supplied by a surface acoustic wave (SAW) oscillator 156. This product, centered at 915 MHz, is then fed to the bandpass filter 143 with 3 dB points at 906 MHz and 924 MHz, through power amplifier 158 and to the camera antenna connector 160 and then to antenna 24. Although the above design utilizes 72 MHz as the IF, other frequencies may be used if found more practical for IC integration or less prone to interference.

PROTOTYPE RECEIVER AND TRANSMITTER DEVELOPMENT

During the course of the development of the present invention, it became necessary to develop a prototype receiver and transmitter to test the concepts underlying the frequency modulated direct sequence (FMDS) signal processing and transmission scheme. The prototypes discussed below were developed for that purpose using available components in order to avoid unnecessary duplication and to allow the rapid substitution of components to evaluate changes in the design. In practice, the invention will utilize custom designed electronics consisting of custom and semi-custom integrated circuits. The receiver and transmitter described below have been keyed, to the greatest extent possible, to the equivalent circuits in the system described above, in order to illustrate the relationships between the prototype and final versions of the receivers and transmitters. Also included in Table 1 is a summary of the circuits that are to be integrated into various custom and semi-custom chips that will be incorporated into the production versions of the invention.

PROTOTYPE AUDIO-VIDEO TRANSMITTER

The video transmitter illustrated in FIG. 11A,B accepts audio signals from a microphone and video signals from a television camera and combines them into a standard inter-carrier format. Frequency modulation for the video signal is then used instead of the more common amplitude modulation to modulate the signal. As shown in the diagram of FIG. 11A,B, a 60 MHz carrier is frequency modulated by the baseband intercarrier signal and then spread spectrum modulated by one of six different 18 megabit per second (Mbps) codes. After spread spectrum modulation, the 60 MHz frequency modulated signal is translated to 915 MHz by mixing with an 855 MHz fixed oscillator signal.

According to the scheme used in the prototype transmitter, the signal is independently modulated in three different ways: 1) a 4.5 MHz subcarrier is frequency modulated by audio information (this is the same as standard television); 2) video and 4.5 MHz subcarrier are combined and used to frequency modulate a carrier; 3) the frequency modulated (FM/FM) carrier is spread spectrum (BPSK) modulated.

Channel selection is accomplished through use of code division multiplexing. One of six from a family of 8191 "Gold" codes is selected for spread spectrum modulation and this provides a means for the receiver to reject all but the correctly coded signal. Six simultaneous transmissions are possible through use of different codes.

The following section is a more detailed description of the operation of the prototype transmitter.

Video input from a camera source is low pass filtered and linearly summed with the 4.5 MHz audio subcarrier. The 4.5 MHz audio subcarrier is, in turn, frequency modulated by any audio input signal and is phase locked to a 4.5 MHz crystal stabilized reference oscillator. The same 4.5 MHz oscillator is used to generate all but one of the frequencies in the transmitter. The 4.5 MHz frequency modulated audio subcarrier is phase locked directly to the 4.5 MHz crystal reference. The 855 MHz signal used for upconverting the 60 MHz modulated carrier to 915 MHz is independently generated, using a surface acoustic wave resonator (S.A.W.R.) as the stabilizing element. After being converted to a 915 MHz center frequency, the FM/FM spread spectrum signal is filtered and amplified to 100 milliWatts. Then it is applied to the transmitter antenna.

CIRCUIT DESCRIPTION

Video input signals are low pass filtered and taken to a summing Junction, followed by an emitter follower. The other summing junction input is the 4.5 MHz from the 4.5 MHz VCO (MC4024). A 20K ohm variable resistor is employed in the 4.5 MHz summing junction. A 60 MHz signal is generated by dividing the 4.5 MHz oscillator by 12 and multiplying the result by 160. 18 MHz is generated by dividing the 4.5 MHz oscillator by two (2) and multiplying by eight (8) to allow control of the 4.5 MHz subcarrier level. The 4.5 MHz phase lock loop consists of the 4.5 MHz crystal controlled oscillator (74HC00) an exclusive-OR gate phase detector (74HC86), an RC loop filter and the previously mentioned 4.5 MHz VCO (MC4024).

A divide by 12 counter (74LS92) divides the 4.5 MHz oscillator output and provides 2.25 MHz to an 18 MHz phase lock loop. It also provides 0.375 MHz to a 60 MHz phase lock loop. The 18 MHz loop consists of an 18 MHz VCO (MC4024) a -8 (two 74HC74's) counter, an exclusive-OR phase detector (74HC86) and an RC loop filter. For 60 MHz generation, a 60 MHz VCO (MC1648) is divided by 160

$$\left( \frac{1}{4 \times 10 \times 4} \quad :74F74, 74LS90, 74HC74 \right)$$

and compared to the 0.375 MHz counted-down reference signal. MSA-0104 amplifiers are provided at the 60 MHz VCO output to isolate the VCO and provide sufficient drive power to the counters and to the spread spectrum code modulator.

The 18 MHz VCO is output through a 74HC00 acting as a clock driver for the code generator. From the code modulator, where the 60 MHz FM/FM modulated carrier becomes a spread spectrum signal, the signal goes to an amplifier (MSA-0104) and a mixer (SBL-1X) where it is multiplied with the 855 MHz S.A.W.R. oscillator output. The sum of the 855 MHz signal and the 60 MHz signal is the desired 915 MHz FM/FM/spread spectrum modulated signal. The code is generated by employing two shift register sequence generators (each two 74HC174's, ½ 74HC74 and three of five shared 74HC86's). Each generator provides a linear maximal sequence 8191 chips long. These are then modulo-20 added together in one of six "Gold" code sequences. The combined Gold code sequence is then taken to a driver (74HC74) that biphase modulates the (SBL-1X) double balanced code modulator. After the code modulated FM/FM carrier is upconverted to 915 MHz, it is filtered (TOKO 1568HW), amplified (MAR-8 and MC5809) and output to the antenna.

PROTOTYPE VIDEO RECEIVER

Figure 18B:
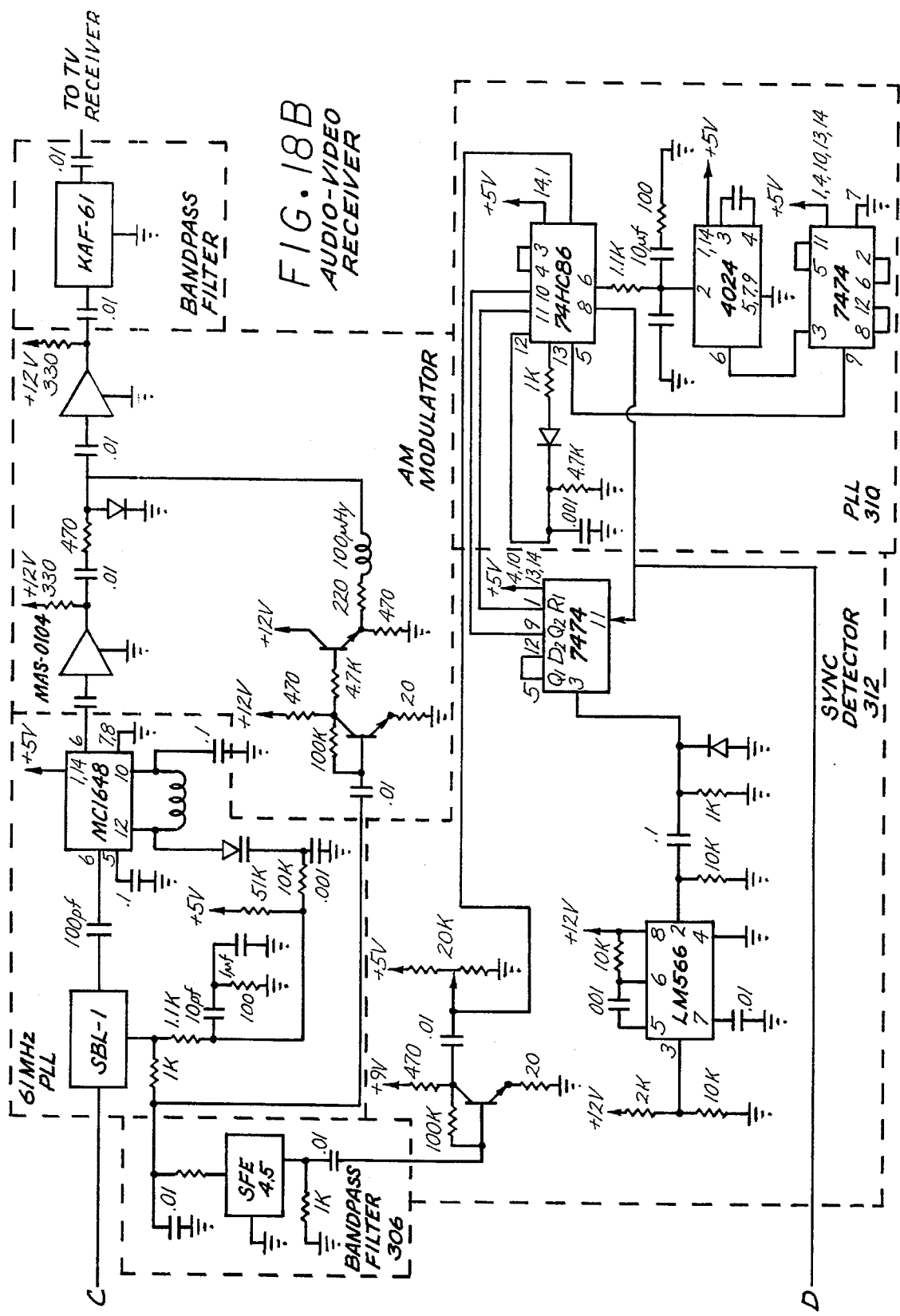
FIG. 18 is a schematic block diagram of the audio-video receiver for the television module of the present invention.
FIG. 18A,B is a schematic block diagram of the prototype audio-video receiver of the present invention.

The 915 MHz video receiver illustrated in FIG. 18A,B incorporates a 915 MHz bandpass filter, an amplifier and a mixer/converter that converts the signal to 61 MHz and simultaneously removes the spread spectrum modulation. The receiver also synchronizes the spread spectrum code, demodulates the signal and outputs a properly modulated channel three carrier for use by a standard television receiver. The operation of the receiver, which is described below, is functionally equivalent to the diagram illustrated in FIG. 18. Accordingly, to the greatest extent possible and as noted below in the summary of differences, equivalent functions to those in FIG. 18 are grouped in FIG. 18A,B.

Referring to FIG. 18A,B, a 915 MHz input signal from antenna 26 is passed through a bandpass filter (TOKO 1568HW) which rejects unwanted signals, is amplified by the amplifier (MAR-8) and applied to a mixer (SBL-1X). The other input to the mixer is a spread spectrum signal, identical to the received signal except for the FM/FM modulation and at a frequency displaced from that of the input and represents a fixed frequency spread spectrum modulated signal at 854 MHz. This 854 MHz signal is generated by modulating an 854 MHz carrier from a S.A.W.R. stabilized oscillator, with a code identical to that used in the transmitter.

After conversion to 61.25 MHz and removal of the spread spectrum code modulation, the FM/FM signal is amplified and filtered. Then the 61.25 MHz frequency modulated signal with 4.5 MHz FM subcarrier, is demodulated by a 61.25 MHz phase lock loop made up of a 61.25 MHz VCO (MC1648), an RC filter and a phase detector (SBL-1). The baseband intercarrier signal consisting of video plus 4.5 MHz audio subcarrier is then sent to a 61.25 MHz AM modulator and a 4.5 MHz bandpass filter (SFE 4.5). The 61.25 MHz AM modulator output is filtered to suppress the carrier and lower sideband, using a surface acoustic wave filter (KAF-61). This filtering process produces a standard television signal at the channel three frequency. The amplitude modulator consists of two amplifiers (MSA-0104) and a diode modulator. The diode modulator is driven by an amplifier/emitter follower pair, which varies the current (and therefore the impedance) in a diode and allows variarion of the signal amplitude by a factor of approximately 20 db.

The 4.5 MHz filtered subcarrier received goes to an 18 MHz phase lock loop made up of an 18 MHz VCO (MC4024) a divide by 4 counter (74HC74) and a phase detector (74HC86). When the 4.5 MHz signal is present, it drives an amplifier (¼ 74HC86) which, in turn, drives a diode detector. When the diode detection output is above zero, the code clock tracks the incoming signal by allowing the 18 MHz phase lock loop to track the incoming 4.5 MHz subcarrier. Since the transmitter's 18 MHz clock is derived from the same 4.5 MHz subcarrier, the receiver's code clock tracks the transmitter's code clock by this process.

A separate 8200 bit per second search clock (LM566) causes the receiver clock to be shifted from the nominal 18 MHz, by deleting clock pulses at the 8200 pulse per second rate. This, in turn, causes the receiver code to operate at a rate 8200 bits per second slower than the transmitter whenever the receiver's code is not synchronized with the transmitter's code.

As soon as the 4.5 MHz subcarrier is recognized (which requires the codes to be synced), the clock pulse deletion is inhibited, the 18 MHz loop locks and the receiver tracks the transmitted signal.

SUMMARY OF PROTOTYPE AND PRODUCTION ELECTRONICS DIFFERENCES

The following is a summary of the differences between the prototype and production transmitters and receivers.

1. The prototype uses 60 MHz as its IF. This simplifies construction since parts (filters and resonators) were more readily available at 60 MHz than 72 MHz.
2. The prototype has no audio preamp, AGC, limiting or preemphasis. These changes were unnecessary for the prototype development but are easily implemented to improve production electronics performance.
3. The prototype uses discrete oscillators instead of custom frequency synthesizers, such as the production electronics will use.
4. The band select switch is not used on the prototype.
5. In the prototype receiver, the IF is shifted to produce a vestibule sideband IF signal. This signal is then demodulated to an intercarrier (video baseband plus FM audio carrier) signal which is then amplitude modulated and fed to VHF channel 3 of the TV receiver. In the production model, the IF is not shifted since the RF signals are demodulated to baseband video and audio. These signals are then amplitude modulated to VHF channel 3 or 4 as selected by the user.

Compared to the prototype, the production unit will incorporate the following changes to improve the benefits of the invention:

1. Audio frequency filters will be made with on chip capacitors and gyrator (synthetic inductors) circuits.
2. The production system is designed using mostly untuned amplifiers which require fewer discrete components.
3. Mixers are "active mixer" type which use few discrete components.
4. Oscillators will all be either crystal controlled or surface acoustic wave which do not require tuning components.
5. Surface mount construction will be utilized.
6. Fixed frequency ceramic filters will be used wherever possible.

The following is a table of electronic components of the camera module system that are to be integrated incorporating the components to be combined and the type and process of integrated circuits to be used:

TABLE 1

CAMERA MODULE INTEGRATION SCHEDULE

| IC# | NAME | PROCESS | BLOCKS & DRAWING IDENTIFICATION NUMBERS |
|---|---|---|---|
| 1. IC1 | Audio | CMOS | Audio Preamp - 132 |
| | | | AGC Amp & Limit - 134 |
| | | | Preemphasis Amp - 136 |
| | | | Audio Output Amp - 138 |
| | | | Audio Modulator - 140 |
| 2. IC2 | Sync Generator | CHMOS | XTAL OSC - 120 |
| | | | Freq. Divider - 122 |
| | | | Sync. Generator - 118 |
| | | | Vertical line count - 124 |
| | | | Horizontal pixel counter - 126 |
| | | | Pause control encod - 128 |
| 3. IC3 | Video | NMOS | Video Preamp - 102 |
| | | | Level detector - 104 |
| | | | AGC Amp - 108 |
| | | | Level detector - 112 |
| | | | Video Amp - 114 |
| | | | Video Proc - 116 |
| | | | Video Output Amp - 130 |
| | | | Detector Diode - 110 |
| 4. IC4 | CCD | MOS | CCD Image Pickup - 100 |
| 5. IC5 | LOGIC | CHMOS | Band Select Code Generator - 148 |
| 6. IC6 | FREQ. SYNTH. | NMOS | Freg. Synthesizer - 142 PLL - 146 |
| 7. IC7 | HF MIXER | BIPOLAR | Mixer - 150 |
| | | | AMP - 152 |
| | | | Mixer - 154 |
| | | | S.A.W. Oscillator - 156 |
| | | | Summer - 141 |
| 8. IC8 | R/C | NMOS | AMP - 166 |
| | | | Mixer - 168 |
| | | | 3 Stage IF AMP - 172 |
| | | | FM Quad. Detector - 174 |
| | | | Output AMP - 176 |
| | | | Waveform Cond. - 178 |
| 9. IC9 | D/A | CMOS | Address Decoder - 180 |
| | | | Data Decoder - 182 |
| | | | D/A Converter - 186 |

TABLE 1-continued

CAMERA MODULE INTEGRATION SCHEDULE

| IC# | NAME | PROCESS | BLOCKS & DRAWING IDENTIFICATION NUMBERS |
|---|---|---|---|
| | | | Power Saver - 192 |

RADIO CONTROL RECEIVER

FIG. 12 illustrates a radio control (RC) receiver 32 designed to operate as a one of six band, eight channel receiver utilizing high data integrity pulse code modulation (PCM) in the 27 MHz band. The receiver 32 also incorporates a power saver feature which disables audio/video transmission three minutes after the R/C information ceases to be updated and automatically reactivates audio/video transmission upon receiving updated R/C information. This feature is particularly important for toys that may be operated by very young children who may not have the attention span to remember to turn off the toy. Such a feature is one of many examples in the present invention of incorporation of special features into the invention to adapt its use to the specialized requirements of the toy industry.

The 27 MHz signals (26.995 MHz, 27.045 MHz, 27.095 MHz, 27.145 MHz, 27.195 MHz, 27.255 MHz) are received from the antenna 22 through connector 162 and fed through a bandpass filter 164 to a wideband amplifier 166 which includes an AGC input. This signal is then mixed by mixer 168 with a 16.3 MHz frequency supplied by the frequency synthesizer 142. The product is then fed through a 10.7 MHz ceramic bandpass filter 170 to a three stage intermediate frequency amplifier 172. The IF amp output is then demodulated through an FM quadrature detector 174 with a portion of this signal FED back to the AGC input of amplifier 166 and again amplified by output amplifier 176. The signal is then shaped and conditioned by waveform conditioner 178 into the original digital bit stream and fed to the address decoder 180 and data decoder 182. The address decoder 180 generates a strobe signal for each of the eight channels and feeds them to the camera module connector 184 of connector 60. The data decoder 182 provides serial to parallel conversion and reconstruction of the original data. This data is then fed to the digital-to-analog (D/A) converter 186 which in turn, generates a time multiplexed analog servo position voltage 190 for each of the eight channels. The data decoder also provides a data active status control to the audio/video transmitter DC power saver processor 192. This processor times and compares this status control with a clock signal 194 from the frequency synthesizer 142 and disconnects the A/V transmitter battery supply whenever the power saver disable control from the camera connector is not enabled and 3 minutes of R/C inactivity has occurred. The frequency synthesizer 142 provides the master clock 194 and multiple reference frequencies for the circuits in the camera module 2. Each of these frequencies is phase locked to its internal 5.12 MHz crystal oscillator. Additionally, the frequency synthesizer selects one-of-six intermediate frequencies (16.295 MHz, 16.345 MHz, 16.395 MHz, 16.445 MHz, 16.495 MHz, 16.545 MHz) as selected by the band select stage described above.

While the above design utilizes the 27 MHz R/C band commonly used for radio control of air, land and sea model craft, this design will work equally as well when using the 72 MHz and 75 MHz bands with appropriate changes to the IF and filters.

INFRARED TRANSMISSION SYSTEM

While the above discussion has described an RF audio-video transmission system, an attractive alternative means to transmit the audio-video signal from the toy to the TV module utilizes an infrared transmitter-receiver system that is configured for this specific application. The infrared transmitter-receiver replaces the radio frequency audio-video transmitter and receiver described above and provides a benefit compared to such a system, in that it does not use transmission frequencies that are susceptible to radio frequency interference and such a system does not require FCC approval for operation at the low power levels to be used.

Figure 13:
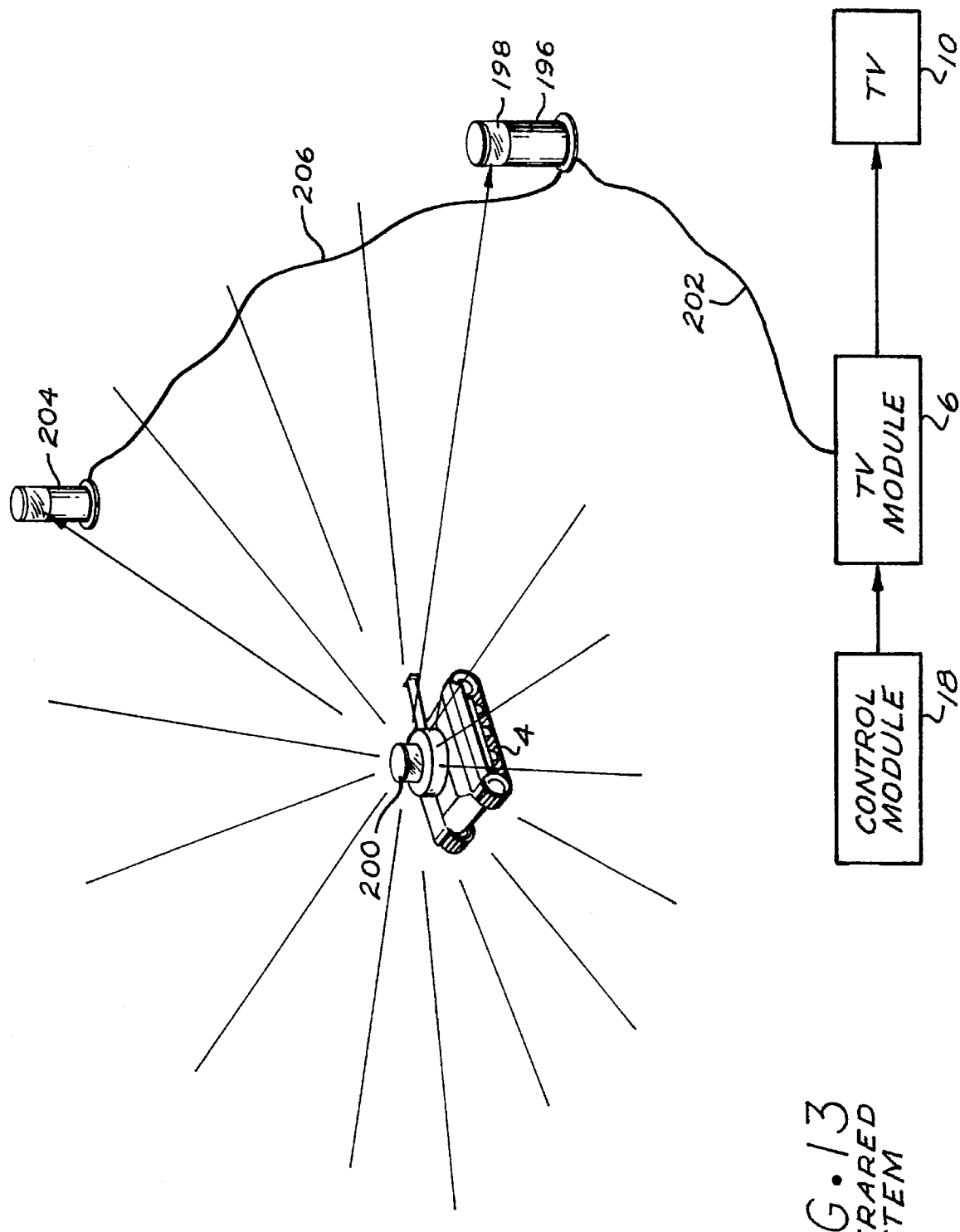
FIG. 13 is an illustration of the basic arrangement of the infrared transmitter and receiver system for an alternate embodiment of the present invention.

Referring to FIG. 13, an overview of the basic concept behind the infrared transmission system of the subject invention is illustrated. Using this concept, an infrared pylon 196 containing a receiver 198 is deployed somewhere in the play area, more or less centrally located in the range desired for the toy 4. The infrared receiver 198 converts the signal received from the infrared transmitter 200 in the toy to a video signal which is then transmitted to the TV module 6 by a coaxial wire 202 provided. More than one infrared pylon may be used to cover a larger play area, in which case slave infrared pylon 204 may be "daisy chained" by means of extension coaxial cables 206 to extend the play area in which an adequate signal may be received. Numerous variations on the placement of the receivers are possible, which provide flexibility in the play area to be used, depending upon the range of the infrared transmitter-receiver system and the number of pylons used.

Figures 14, 15:
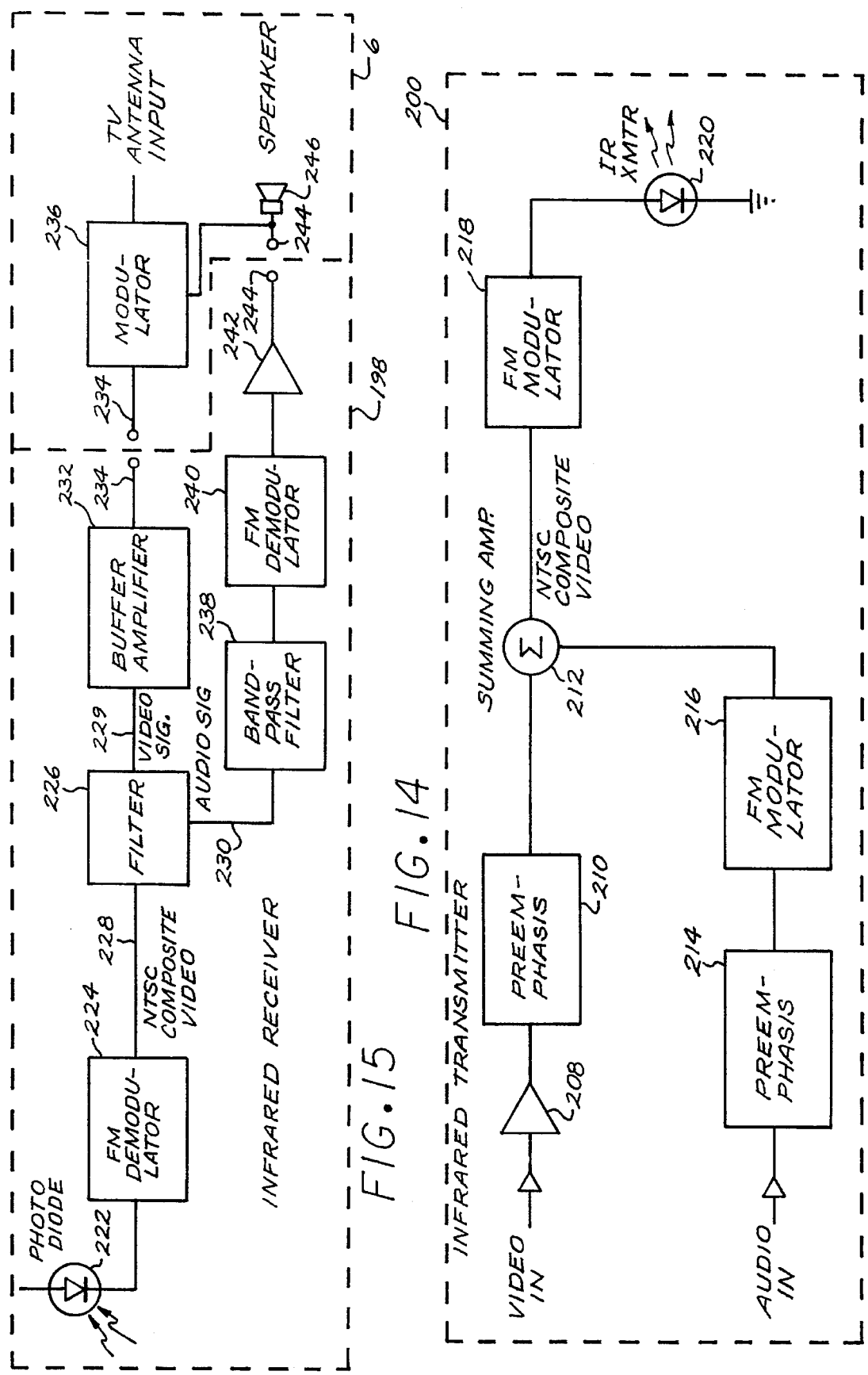
FIG. 14 is a schematic block diagram of the infrared transmitter for an alternate embodiment of the present invention.
FIG. 15 is a schematic block diagram of the infrared system for an alternate embodiment of the present invention.

FIG. 14 illustrates a schematic diagram of the infrared transmitter 200 used in the present invention. The video input from the camera is fed to amplifier 208 and preemphasiser 210 before being combined in summing amplifier 212 with the audio input which has passed through an audio preemphasiser 214 and FM modulator 216 prior to summing. The output of summing amplifier 212 is an NTSC composite video signal which is them FM modulated by FM modulator 218 and used to drive infrared transmitter light emitting diode (LED) 220. The output of the infrared transmitter LED 220 is an FM modulated light signal in the infrared spectrum, the exact frequency of which is dependent upon the LED chosen.

FIG. 15 indicates the infrared receiver 198 of the present invention which employs, as a detector, photo diode 222 the output of which is fed to FM demodulator 224 in order to reconstruct the NTSC composite video signal 228 transmitted from transmitter 200. Filter 226 is used to separate video signal 229 and audio signal 230. The video signal 229 goes through a buffer amplifier 232 before being conducted to a 75 Ohm video cable 234. In TV module 6, the video signal is thereafter amplified by modulator 236 suitable to derive the television antenna input at VHF frequencies. The audio signal 230 is passed through bandpass filter 238 and FM demodulator 240 in order to reconstruct the audio signal as it existed prior to amplification and modulation in the transmitter. This signal is then amplified by amplifier 242 and fed to a 600 Ohm audio cable 244 to drive modulator 236 or in the alternative, a speaker 246 in the TV module 6.

Figure 16:
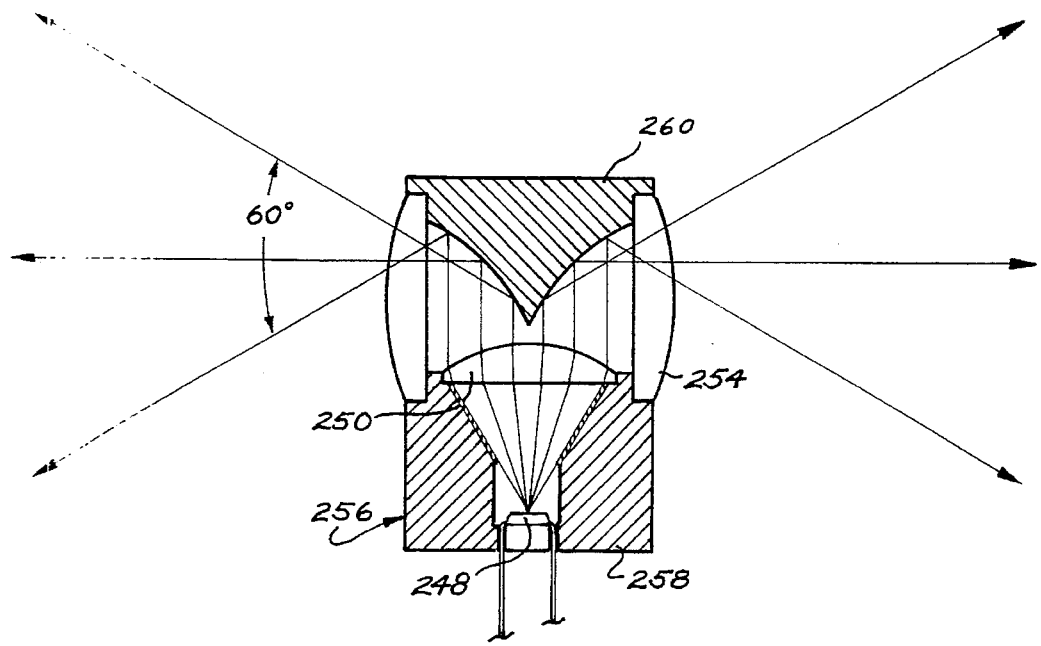
FIG. 16 is a cross section of an infrared emitter system, illustrating the optical ray paths of the pattern of the emitter system.

FIG. 16 illustrates one configuration which may be used for the infrared transmitter 200. This system uses the infrared diode 248 as the transmitter power source and the output of the diode 248 is input via columnnating lens 250 to an internal reflector 252 that focuses the output through an infrared transparent lens 254 that has a lens curvature designed to provide the required vertical spatial pattern. The structure of the transmitter is a plastic housing 256 consisting of a base portion 258 and an upper portion 260. The upper portion 260 has reflector 252 formed into it and sandwiches the essentially cylindrical lens 254 between it and the base portion 258, which also serves as a mount for infrared diode 248 and lens 250.

Figure 17:
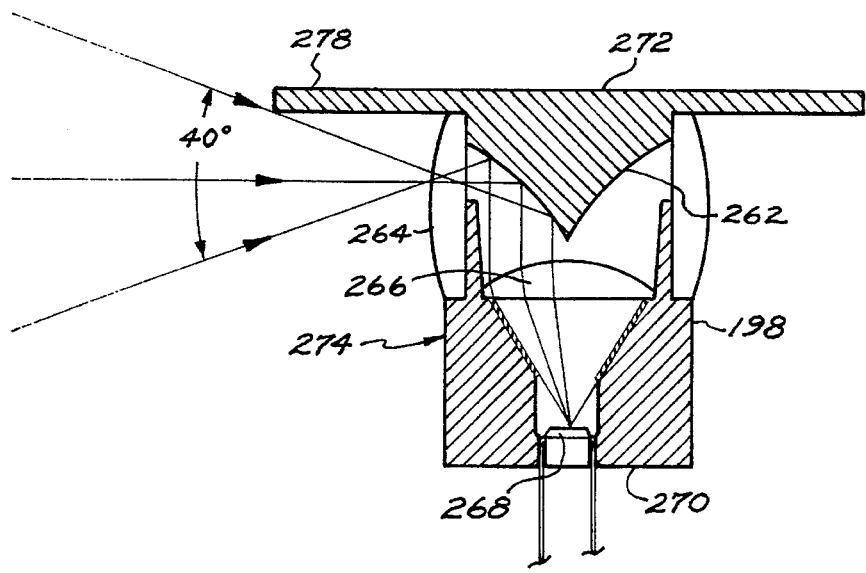
FIG. 17 is a cross section of an infrared receiver optical system illustrating the internal arrangements of the components and the ray paths for light impingment on the optical system.

FIG. 17 illustrates the arrangement of an infrared receiver 198 of the type used in infrared receiving pylon 196. The receiver 198 utilizes the construction similar to transmitter 200 in that a curved reflector 262 collects incoming light through filter lens 264 and directs it through focusing lens 266 towards infrared detector 268 mounted in the base of housing 270 of the receiver. Lens 266 serves to collect the infrared signal directed towards the lens from reflector 262 and focus it upon the active area of detector 268. Reflector 262 is formed in the upper portion 272 of housing 274. Upper portion 272 also has formed into its top surface a lightshade 278 to prevent the introduction of stray light radiation from sources above the receiver 198. The upper portion 272 and lower portion 270 sandwich filter lens 264 between them to form housing 274. Reflecting surface 262 is formed of a silvered layer on the reflector surface formed in the material of upper housing 272.

TV MODULE

The TV module performs the following functions in the present invention:

1) receives and demodulates the audio/video FMDS signal or IR signal;
2) remodulates the audio/video baseband signals into NTSC TV channel 3 or 4 RF signal;
3) decodes the pause control signal for remote control of an external video cassette recorder; and
4) generates and transmits pulse code modulated radio control signals as derived from an operator input through control stick inputs,
5) selects one of the channels chosen at the camera module for R/C transmission and audio-video reception by use of a channel selection switch Each of the above functions is illustrated in further detail in the following description and the accompanying exemplary drawings.

AUDIO/VIDEO RECEIVER

FIG. 18 illustrates the audio/video receiver 46 designed to receive the audio/video signal from the transmitter 30 described above. The audio and video signals received are remodulated to VHF channels 3 or 4 for reception by a standard (NTSC) television receiver.

The broadband signal is fed from the antenna 26 through a 915 MHz dual helical resonator bandpass filter 278 to an AGC amplifier 280. The output from this amplifier is then actively mixed by mixer 282 with the product of the 18 MHz direct sequence spreading code generated by code generator 284 and the 843 MHz S.A.W. reference oscillator 286, which are mixed in mixer 288 and amplified by amplifier 290. This produces a 72 MHz IF frequency which is then fed to the slope detector 292. In the slope detector 292, the signal is first bandpass filtered at 72 MHz by bandpass filter 294, amplified by amplifier 296 and then fed to an envelope detector 298. The output of the envelope detector 298 is then fed to the AGC input of the 915 MHz amplifier 280 and to the 4 MHz lowpass filter 300 which outputs the original baseband video signal. The output of the lowpass filter 300 is also fed to the video line counter 302 where pause control information is decoded from video line 15 and passed along to the pause control relay 304. The output of the envelope detector 298 is also fed through a 4.5 MHz ceramic bandpass filter 306 which outputs the audio sub-carrier to a quadrature detector audio demodulator acting as an audio discriminator 308 and which outputs the original baseband audio signal.

The audio sb-carrier signal is also fed to a phase locked loop [PLL] 310 which generates the 18 MHz clocking frequency for the sync detector 312 and code generator 284. The sync detector 312 allows sync slip compared to the code generator 284 by preventing periodic clock pulses from reaching the code generator 284. This slippage occurs only until the code generator 284 locks to the transmitter code generator codes. The code is slipped one complete cycle in approximately one second. Thus, using this system, the maximum delay before lock is one second. The code generator 284 and band select logic 314 are identical to those described for the audio-video transmitter. The audio and video baseband signals are then remodulated by a TV modulator 316 to TV channel 3 or 4 and fed to an antenna relay 318 which replaces the TV antenna signals with the output of the modulator whenever the TV module AC power is on.

R/C TRANSMITTER

Figure 19:
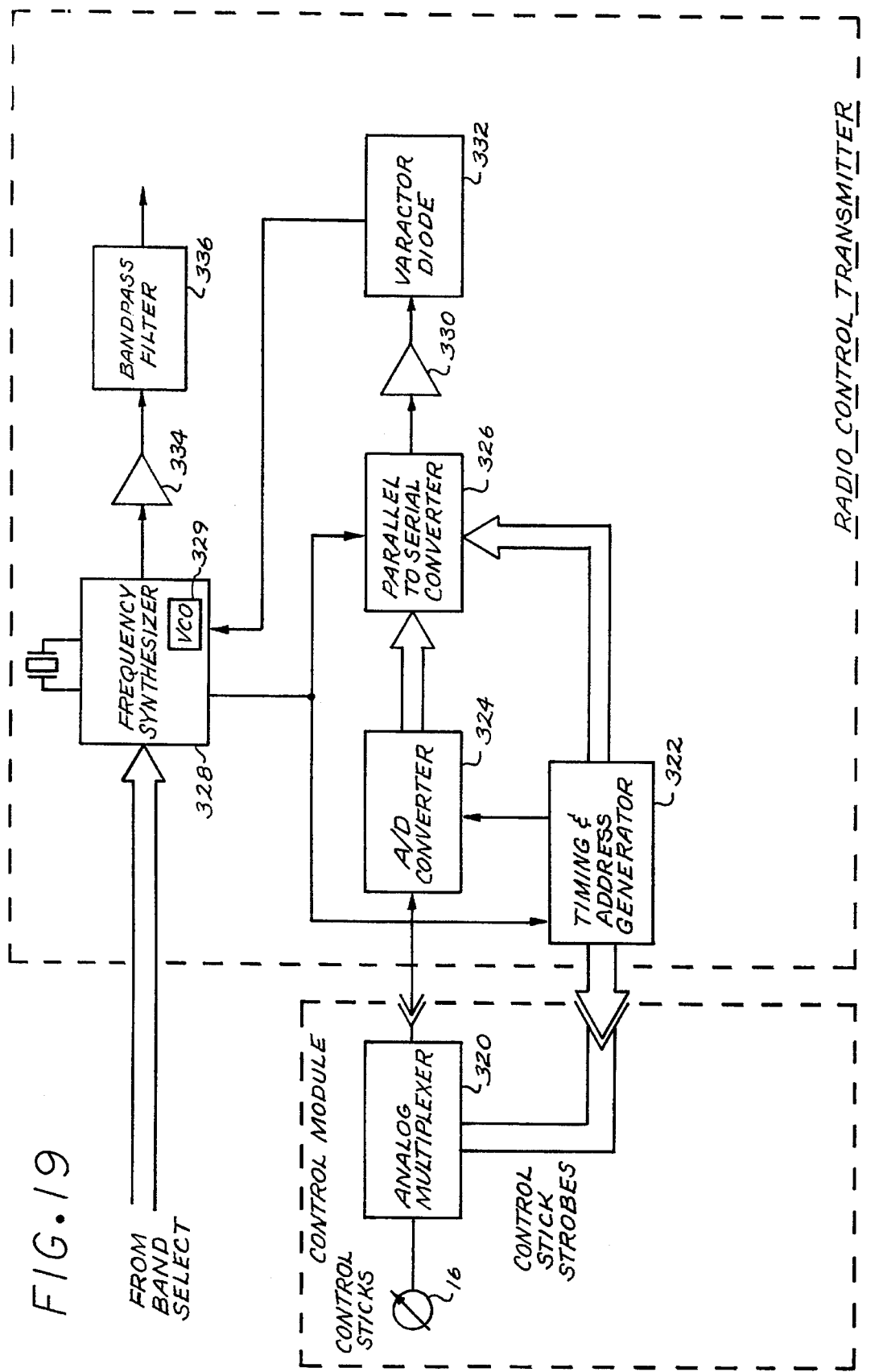
FIG. 19 is a block diagram of the control module and radio control transmitter of the present invention, illustrating the internal arrangement of the major components.

FIG. 19 illustrates a radio control (R/C) transmitter 50 designed to convert operator control stick 16 positional information into an electrical signal and then transmit this information to the compatible radio frequency receiver 32 in the toy 4 described above.

The control handsets 16 typically supply a 0–5 volt proportional signal approximately 30 times a second to an analog data selection and multiplexer 320 which is sequentially addressed by the address generator 322. The analog multiplexer 320 output is fed to a analog to digital (A/D) converter 324 and output as 8 bit parallel data to the parallel-to-serial converter 326. The parallel-to-serial converter 326 produces a pulse code modulated (PCM) serial bit stream containing word sync, channel address and channel data. The timing and address generator 322 receives a 4800 Hz clock from the frequency synthesizer 328 which is used to generate control stick and channel addresses and convert cycle timing for the A/D converter 324. The output of the parallel-to-serial converter 326 is fed to the scaling amplifier 330 used to drive the varactor diode 332 which frequency shift key (FSK) modulates a 27 MHz voltage controlled oscillator (VCO) 329 inside the frequency synthesizer 328. The frequency synthesizer 328 generates the appropriate 27 MHz frequency based on the band selected similar to that described above for the transmitter. The FSK output from the frequency synthesizer 328 is fed to a final power amplifier 334 and the output of amplifier 334 is fed to a 27 MHz bandpass filter 336 and to the TV module antenna 20.

CAMERA MODULE CONSTRUCTION

Referring to FIG. 20, the camera module 2 of the present invention is configured to advantageously incorporate and combine most of the important elements associated with the television camera, audio-video transmitter and R/C receiver subsystems. Camera module 2 incorporates a water-resistant case 338 formed in two parts, a forward member 340 and rearward member 342, that are sealed at their junction 344 by an elastomer seal 346 attached to the aft part of the forward housing 340. Seal 346 also seals and contains the circuit boards in their positions and urges the CCD focal plane 100 forward against the focal plane stops 370.

Lens system 36 is mounted in the forward housing 340 and contains lens elements 68, 70, as described above, to provide a wide angle lens configuration when combined with lens element 72 mounted in aft lens housing 348 and operating through the focal length of the lens 350 onto CCD focal plane 100. An audio microphone 8 (not shown in this figure) is mounted adjacent to the lens 36 and provides an electrical signal to one of two electronics boards 352, 354 mounted within the body of the camera housing to incorporate the video camera, transmitter and receiver electronics, as described above. Connector 184 is designed to be engaged by external connector 356 upon insertion of connector 356 through opening 358 in the aft part of the housing 342. A rotating door 360 is designed to prevent intrusion of foreign objects or contaminants when the module is not in use. Ball mounting system 362 receives an external ball mount 364, thereby allowing the camera module 2 to be pivoted about said ball mount 364 in order to direct its field of view in a desired direction. An elastomer disk 365 is inserted into mounting system 362 above, to positively preload ball mount 364 when it is inserted, thus tending to prevent undesired movement of the camera module 2 around ball mount 364.

Referring to FIG. 21, which is a perspective, exploded view of the camera module 2, a transparent objective lens assembly 68 is mounted in the forward end of the body and protects the internal components of lens 36, iris assembly 34 and CCD focal plane 100. The electronics includes a pair of circuit boards 352, 354, one over the other, with the Charge Coupled Device (CCD) focal plane 100 positioned in the forward part of the module and a multi-pin connector 184 at the rear. This core assembly slides into the case 340 from the rear and is retained by the rear cap 342. The desired ruggedness is achieved by using a high impact plastic such as polycarbonate for the two-piece case. Such material has the combined strength and dimensional stability to permit the precise positioning of bosses and miniature threaded holes as integral parts of the design.

The outer lens assembly is installed by press fit into the case. The optical elements of the lens system have a number of features designed for this application. The outer lens surface 66 of the objective lens 68 is flat and less susceptible to abrasion than a convex surface. A cyanacrylate or silicon sealer is added at installation to make the seam watertight. The molded forward case 340 includes stepped recesses 348 and 370 which serve to locate the lens housing elements and focal plane. The rear section of the optics package includes molded lens element 72 which mounts against shoulder 348 and includes recess 372 to house iris 34. Although a solid-state iris of the liquid crystal type may be incorporated when it is sufficiently developed for this application, a simple electro-mechanical unit of the type well known in the art, is shown in the camera's forward section adjacent to the microphone 8. Two moving blades 90, 92 form a diamond shaped iris aperture when they are driven in opposite directions through gears 94, 96 by a small gear on the iris control motor 38, which responds to a signal proportional to signal strength at the focal plane from the camera circuitry as described above. A channel selector switch 374 is incorporated into the body of the camera module to allow for selection of one of the six channels available for operation of the audio-video transmitter and R/C receiver system. The switch is actuated by inserting and rotating a coin or another similar object in slot 376 in switch 374.

The audio microphone 8 is located next to the iris 34 and is sealed against slots 379 in the case through the use of a mylar diaphram 380. This seal permits the nose of the camera module to be immersed in water for short periods. When the camera is inserted into a water resistant accessory housing, the camera module can be used on model boats, or in wet environments.

As shown in FIG. 21, the image formed by the lens system 36 focuses across an air gap on the face of the CCD focal plane 100. Behind the focal plane, the CCD focal plane array includes image processing circuits which terminate in a connector 184 which is soldered directly to the circuit boards 352, 354. A CCD support structure 368 supports the front of the upper and lower circuit board 352, 354. Pressure from the rear elastomer seal 346 holds the CCD focal plane 100 against CCD support structure 368 in the case.

Whenever possible, components of the camera module serve more than one function. The integral ball joint mount 362 which accepts the tripod swivel mount ball 364 is an example. This component, located near the center of gravity of the camera module 2, also places it near the center of the printed circuit boards 352, 354, attached to the removable core assembly 378. When in place, it spans the interior space transmiting the loads of tripod use to the other side of the case 338. It is secured by a screw threaded ring 380 installed from the outside. Thus, the ball joint mount 378 serves not only as a standoff/support for the boards, but also joins them electrically through molded-in leads soldered to each board.

It will be appreciated by those in the art that the above invention represents a substantial improvement in radio controlled toys, since it allows the operator to enjoy the point of view of both the miniature model or toy as well as the play area surrounding it, in a simple, robust and relatively inexpensive package. While the invention has been described in the context of a toy that is primarily operable on land, the components of the system have been designed to advantageously be applied to airborne or waterborne toys, including submersibles, or toys that may be directly manipulated by the child with feedback provided to the child from a remote playmate who is able to view the operation of the toy through a TV or monitor. The unique presentation of the point of view of the toy by the present invention creates an almost unlimited means of expanding the enjoyment of radio controlled toys while meeting the economy and manufacturability requirements of the toy industry. Previous radio controlled toys have not provided realistic motion, since the speeds also scale to the equivalent of four to seven hundred miles per hour for model cars and very high speeds for aircraft, representing speeds far too fast for human reaction if the point of view is from inside the vehicle, as with the present invention. The present invention may therefore use far slower speeds with the resultant improvement in safety, robustness and "friendliness" through ease of operation for young children, thereby expanding the enjoyment of such toys to younger children who have thus far been prohibited from enjoying radio controlled toys for the above reasons and cost considerations.

Thus, the present invention provides an extraordinary and unexpected benefit to the enjoyment of radio controlled toys as well as wired toys and non-motorized toys, while meeting the economy and manufacturability requirements of the toy industry. In view of this extraordinary promise, while a number of preferred embodiments of the invention have been illustrated and several particular forms of the invention have been described, it will also be apparent that various modifications can be made without departing from the spirit and scope of the invention. Accordingly, it is not intended that the invention be limited except as by the appended claims.

I claim:

1. A method of operating a vehicle from a remote location wherein the vehicle is of a scale size that is too small to accommodate a human operator, the method comprising the following steps:

providing a real-time video camera view of an environment in the vicinity of said vehicle, the view being of a wide angle and having relatively high resolution in the center of the field of view to provide a wide angle image having a high depth of field and being relatively distorted at large angles from the center of the field of view to provide less detail at the periphery of said wide angle image;

converting said wide angle image to corresponding electrical image signals;

transmitting said electrical image signals to a display location remote from said vehicle;

receiving said electrical image signals and displaying said wide angle image, including portions of the image which are relatively distorted at large angles from the center of the field of view, of the environment in the vicinity of said vehicle at said display location to provide a visual perception of operation of the vehicle in the environment;

generating control signals at a remote control location for controlling the operation of said vehicle;

transmitting said control signals to said vehicle;

receiving said control signals at said vehicle; and operating motion control mechanisms associated with said vehicle in response to received control signals to maneuver the vehicle from the remote control location.

2. The method of claim 1 wherein the step of operating motion control mechanisms includes operating propulsion control mechanisms which cause said vehicle to move at an operating speed in the environment and wherein the visual perception of operation of the vehicle is at a speed significantly greater than said operating speed.

3. The method of claim 2 wherein vibrations are induced in said vehicle as it moves in the environment and wherein the visual perception of operation of the vehicle significantly reduces such vibrations at the display location.

4. A method of maneuvering a vehicle, comprising the following steps:

generating a video signal of a field of view by use of a television camera in the vehicle, said television camera having a wide-angle, short focal-length lens system for providing a real-time video camera view of an environment in the vicinity of the vehicle, the view being of a wide angle and having relatively high resolution in the center of the field of view to provide a wide angle image having a high depth of field and for distorting a field of view by visually increasing the apparent size and scope of said environment and accelerating an apparent angular speed of movement of objects in the periphery of the field of view, said wide angle image being relatively distorted at large angles from the center of the field of view to provide less detail at the periphery of said wide angle image;

transmitting said video signal to a remote location;

receiving said video signal; reproducing said wide angle image of said distorted field of view, including relatively distorted portions at large angles from the center of the field of view, on a display;

generating control commands in response to said wide angle image;

encoding said commands for transmission as encoded signals;

transmitting said encoded signals to a receiver at said vehicle;

decoding said transmissions in said receiver; and maneuvering said vehicle in response to said transmissions.

5. The method of claim 4, further comprising the steps of:

detecting sounds in the environment of said vehicle;

transmitting electronic signals corresponding to said sounds to said remote location; and reproducing said sounds from said electronic signals.

6. A method of manipulating a video camera from a remote location by a vehicle which is of a scale size that is too small to accommodate a human operator, the method comprising the following steps:

providing a real-time video camera view of an environment in the vicinity of the vehicle, the view being of a wide angle and having relatively high resolution in the center of the field of view to provide a wide angle image having a high depth of field and being relatively distorted at large angles from the center of the field of view to provide less detail at the periphery of said wide angle image;

converting said wide angle image to corresponding electrical image signals;

transmitting said electrical image signals to a display location remote from the vehicle;

receiving said electrical image signals and displaying said wide angle image, including portions of the image which are relatively distorted at large angles from the center of the field of view, of the environment in the vicinity of the vehicle at said display location to provide a visual perception of moving through the environment;

generating control signals at a remote control location for controlling the operation of the vehicle;

transmitting said control signals to the vehicle;

receiving said control signals at the vehicle; and operating motion control mechanisms associated with the vehicle in response to received control signals.

7. The method of claim 6 wherein the step of operating movement control mechanisms includes operating propulsion control mechanisms which cause the vehicle to move at an operating speed in the environment and wherein the visual perception of operation of the vehicle is at a speed significantly greater than the operating speed thereof.

8. The method of claim 7 wherein vibrations are induced in the vehicle as it moves in the environment and wherein the visual perception of operation of the vehicle significantly reduces such vibrations at the display location.

* * * * *